US012585088B2

(12) United States Patent
Tang et al.

(10) Patent No.: US 12,585,088 B2
(45) Date of Patent: Mar. 24, 2026

(54) CAMERA OPTICAL LENS

(71) Applicant: AAC Optics (Suzhou) Co., Ltd.,
Suzhou (CN)

(72) Inventors: Han Tang, Suzhou (CN); Shunda Zhou, Suzhou (CN)

(73) Assignee: AAC Optics (Suzhou) Co., Ltd.,
Suzhou (CN)

( * ) Notice: Subject to any disclaimer, the term of this patent is extended or adjusted under 35 U.S.C. 154(b) by 315 days.

(21) Appl. No.: 18/401,305

(22) Filed: Dec. 29, 2023

(65) Prior Publication Data

US 2025/0093620 A1     Mar. 20, 2025

(30) Foreign Application Priority Data

Sep. 18, 2023     (CN) .......................... 202311201397.6

(51) Int. Cl.
G02B 13/00        (2006.01)
G02B 6/06         (2006.01)
G02B 9/64         (2006.01)

(52) U.S. Cl.
CPC ........... G02B 13/0045 (2013.01); G02B 6/06 (2013.01); G02B 9/64 (2013.01)

(58) Field of Classification Search
CPC ........ G02B 13/0045; G02B 6/06; G02B 9/64; G02B 13/00; G02B 13/06; G02B 13/18
See application file for complete search history.

(56) References Cited

U.S. PATENT DOCUMENTS

2022/0326483 A1* 10/2022 Tang ...................... G02B 13/04

* cited by examiner

*Primary Examiner* — Charles S Chang
(74) *Attorney, Agent, or Firm* — Wiersch Law Group

(57) ABSTRACT

A camera optical lens includes from object side to image side: first lens, second lens, third lens, fourth lens, fifth lens, sixth lens and seventh lens. Central curvature radius of object-side surface of fourth lens is R7, central curvature radius of image-side surface of fourth lens is R8, a field of view of camera optical lens is FOV, f-number of camera optical lens is FNO, total optical length from object-side surface of first lens to image plane of camera optical lens along optic axis is TTL, on-axis thickness of second lens is d3, focal length of sixth lens is f6, focal length of seventh lens is f7, and following relational expressions are satisfied: $1.00 \le R7/R8 \le 3.00$; $80.00 \le FOV/FNO \le 120.00$; $10.00 \le TTL/d3 \le 20.00$; $-4.00 \le f6/f7 \le -1.00$. The camera optical lens has good optical performance such as large aperture and wide-angle.

12 Claims, 15 Drawing Sheets

10

L1    L2    L3    S1    L4    L5    L6    L7   GF   Si

20

30

Longitudinal Aberration

40

Lateral Color

Longitudinal Aberration

50

60

Lateral Color

Longitudinal Aberration

CAMERA OPTICAL LENS

TECHNICAL FIELD

The disclosure relates to the field of camera optical lenses, in particular to a camera optical lens suitable for handheld terminal devices such as smart phones and digital cameras, laser radar devices and camera devices such as monitors and PC lenses.

BACKGROUND

In recent years, the demand for miniaturized camera lenses has been increasing. For example, under the push of an intelligent detection technology, a 3D spatial detection technology based on a laser radar is rapidly developing. The laser radar camera lens has the advantages of high detection precision, strong anti-interference capability, long coverage range, wide application range and the like, and has been applied to military and civil fields. However, the optical sensing device of the camera lens is not only a charge coupled device (CCD) or a complementary metal-oxide semiconductor sensor (CMOS sensor), and due to the precision of semiconductor manufacturing technology, the pixel size of the optical sensor is reduced, so that the miniaturized camera lens with good imaging quality becomes a mainstream in the current market. In addition, with the development of technology and the increase of diversified requirements of users, the pixel area of the optical sensor is continuously reduced and the requirements on the imaging quality of the system are improving, the structures of five-piece, six-piece and seven-piece lens gradually appear in the lens design. There is an urgent need for a large aperture and wide-angle camera optical lens having good optical characteristics.

SUMMARY

In view of the problems, the present disclosure aims to provide a camera lens, which can achieve a high optical performance while satisfying design requirements for ultra-thin, wide-angle lenses having a big aperture. In view of the above problems, an object of the present disclosure is to provide a camera optical lens, which can meet the requirements of large aperture and wide-angle.

In order to solve the above technical problem, an embodiment of the present disclosure provides a camera optical lens. The camera optical lens includes from an object side to an image side: a first lens, a second lens, a third lens, a fourth lens, a fifth lens, a sixth lens and a seventh lens;

wherein a central curvature radius of an object-side surface of the fourth lens is R7, a central curvature radius of an image-side surface of the fourth lens is R8, a field of view of the camera optical lens is FOV, an f-number of the camera optical lens is FNO, a total optical length from an object-side surface of the first lens to an image plane of the camera optical lens along an optic axis of the camera optical lens is TTL, an on-axis thickness of the second lens is d3, a focal length of the sixth lens is f6, a focal length of the seventh lens is f7, and following relational expressions are satisfied:

$$1.00 \le R7/R8 \le 3.00;$$

$$80.00 \le FOV/FNO \le 120.00;$$

-continued $$10.00 \le TTL/d3 \le 20.00; \text{ and}$$

$$-4.00 \le f6/f7 \le -1.00.$$

As an improvement, an on-axis thickness of the third lens is d5, an on-axis thickness of the fourth lens is d7, and a following relational expression is satisfied:

$$0.80 \le d5/d7 \le 4.00.$$

As an improvement, a central curvature radius of an object-side surface of the first lens is R1, and a central curvature radius of an image-side surface of the first lens is R2, and a following relational expression is satisfied:

$$1.20 \le (R1 + R2)/(R1 - R2) \le 3.00.$$

As an improvement, a focal length of the fifth lens is f5, a focal length of the camera optical lens is f, and a following relational expression is satisfied:

$$1.50 \le f5/f \le 5.00.$$

As an improvement, the first lens has a negative refractive power, an object-side surface of the first lens is convex in a paraxial region, and an image-side surface of the first lens is concave in the paraxial region; and a focal length of the first lens is f1, a focal length of the camera optical lens is f, and an on-axis thickness of the first lens is d1, and following relational expressions are satisfied:

$$-5.62 \le f1/f \le -1.07; \text{ and}$$

$$0.01 \le d1/TTL \le 0.15.$$

As an improvement, the second lens has a negative refractive power, an object-side surface of the second lens is concave in a paraxial region, and an image-side surface of the second lens is convex in the paraxial region; and a focal length of the second lens is f2, a focal length of the camera optical lens is f, a central curvature radius of an object-side surface of the second lens is R3, a central curvature radius of an image-side surface of the second lens is R4, and following relational expressions are satisfied:

$$-150.64 \le f2/f \le -2.60; \text{ and}$$

$$-26.46 \le (R3 + R4)/(R3 - R4) \le -2.45.$$

As an improvement, the third lens has a positive refractive power, an object-side surface of the third lens is convex in a paraxial region, and an image-side surface of the third lens is convex in the paraxial region; and a focal length of the third lens is f3, a focal length of the camera optical lens is f, a central curvature radius of an object-side surface of the third lens is R5, a central curvature radius of an image-side surface of the third lens is R6, and an on-axis thickness of the third lens is d5, and following relational expressions are satisfied:

$$0.80 \leq f3/f \leq 3.50;$$

$$0.33 \leq (R5 + R6)/(R5 - R6) \leq 1.14; \text{ and}$$

$$0.04 \leq d5/TTL \leq 0.28.$$

As an improvement, the object-side surface of the fourth lens is convex in a paraxial region, and the image-side surface of the fourth lens is concave in the paraxial region; and a focal length of the fourth lens is f4, a focal length of the camera optical lens is f, and an on-axis thickness of the fourth lens is d7, and following relational expressions are satisfied:

$$-19.73 \leq f4/f \leq 212.93;$$

and $$0.02 \leq d7/TTL \leq 0.25.$$

As an improvement, the fifth lens has a positive refractive power, and an image-side surface of the fifth lens is convex in a paraxial region; and a central curvature radius of an object-side surface of the fifth lens is R9, a central curvature radius of the image-side surface of the fifth lens is R10, an on-axis thickness of the fifth lens is d9, and following relational expressions are satisfied:

$$0.18 \leq (R9 + R10)/(R9 - R10) \leq 2.37;$$

and $$0.02 \leq d9/TTL \leq 0.11.$$

As an improvement, the sixth lens has a negative refractive power, and an image-side surface of the sixth lens is concave in a paraxial region; and a focal length of the camera optical lens is f, a central curvature radius of an object-side surface of the sixth lens is R11, a central curvature radius of the image-side surface of the sixth lens is R12, an on-axis thickness of the sixth lens is d11, and following relational expressions are satisfied:

$$-33.00 \leq f6/f \leq -3.68;$$

$$-0.53 \leq (R11 + R12)/(R11 - R12) \leq 8.71;$$

and $$0.05 \leq d11/TTL \leq 0.22.$$

As an improvement, the seventh lens has a positive refractive power, and an object-side surface of the seventh lens is convex in a paraxial region; and a focal length of the camera optical lens is f, a central curvature radius of the object-side surface of the seventh lens is R13, a central curvature radius of an image-side surface of the seventh lens is R14, an on-axis thickness of the seventh lens is d13, and following relational expressions are satisfied:

$$1.66 \leq f7/f \leq 8.62;$$

$$-16.02 \leq (R13 + R14)/(R13 - R14) \leq -0.65;$$

and $$0.02 \leq d13/TTL \leq 0.10.$$

As an improvement, the first lens and/or the second lens and/or the third lens and/or the fourth lens and/or the fifth lens and/or the sixth lens and/or the seventh lens are made of glass.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

5

6

Figure 17:
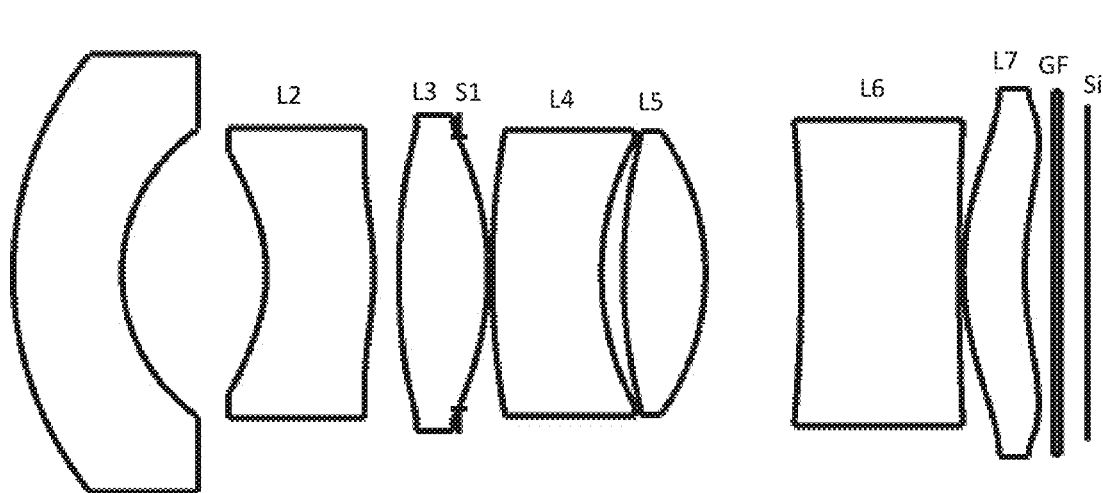
FIG. 17 is a structural schematic diagram of a camera optical lens according to Embodiment 5 of the present disclosure.
Figure 18:
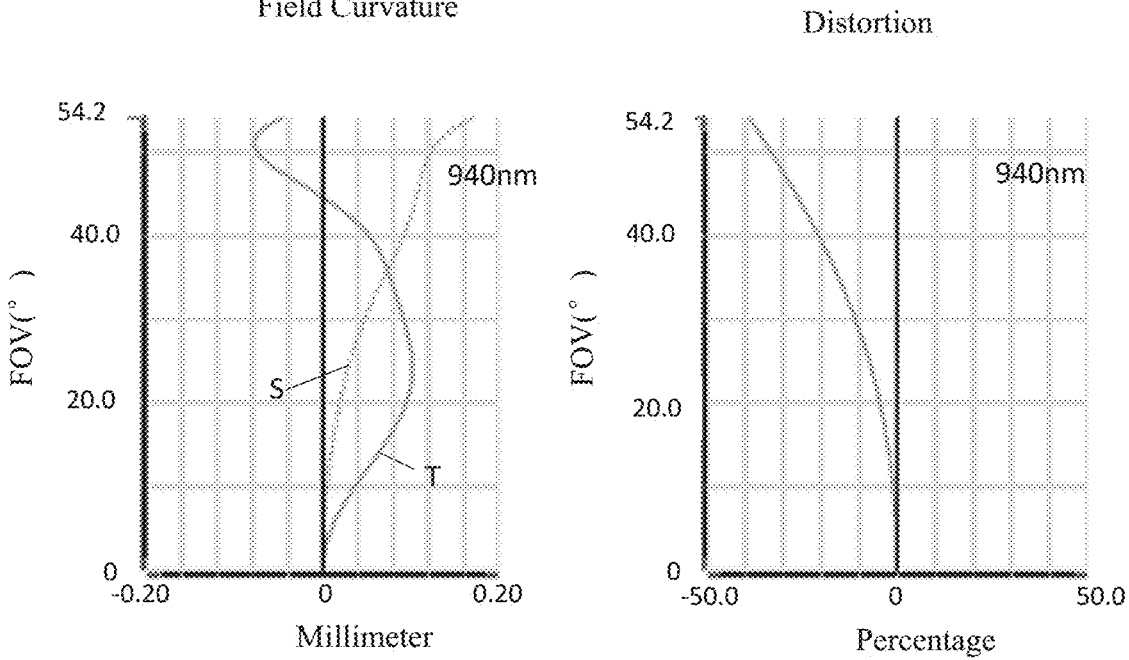
Figure 19:
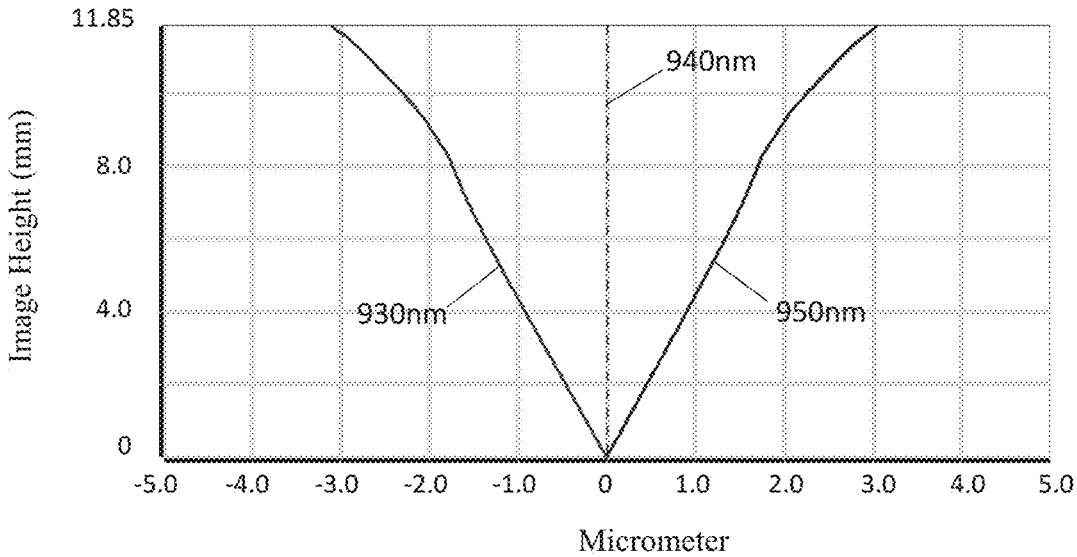
Figure 20:
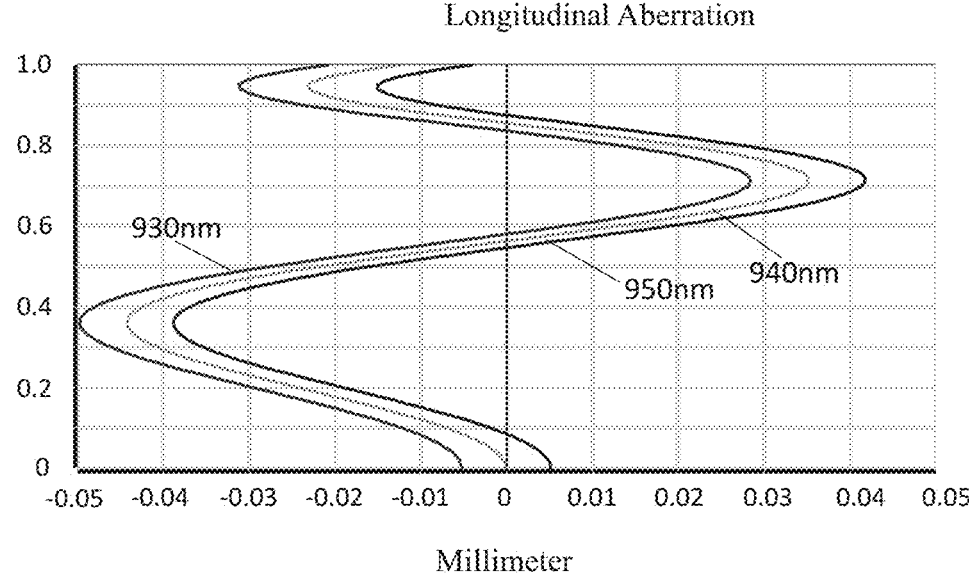
Figure 21:
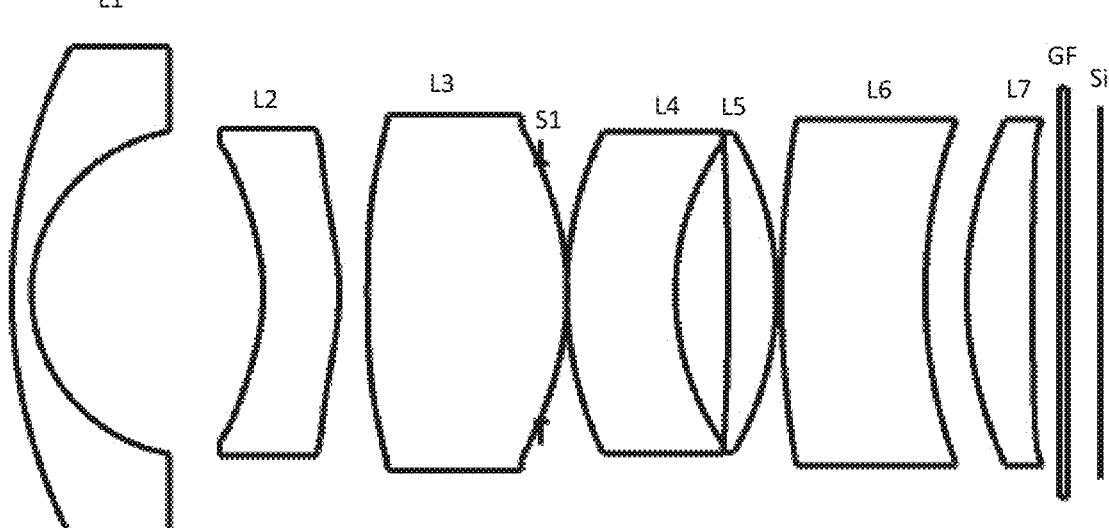
Figure 22:
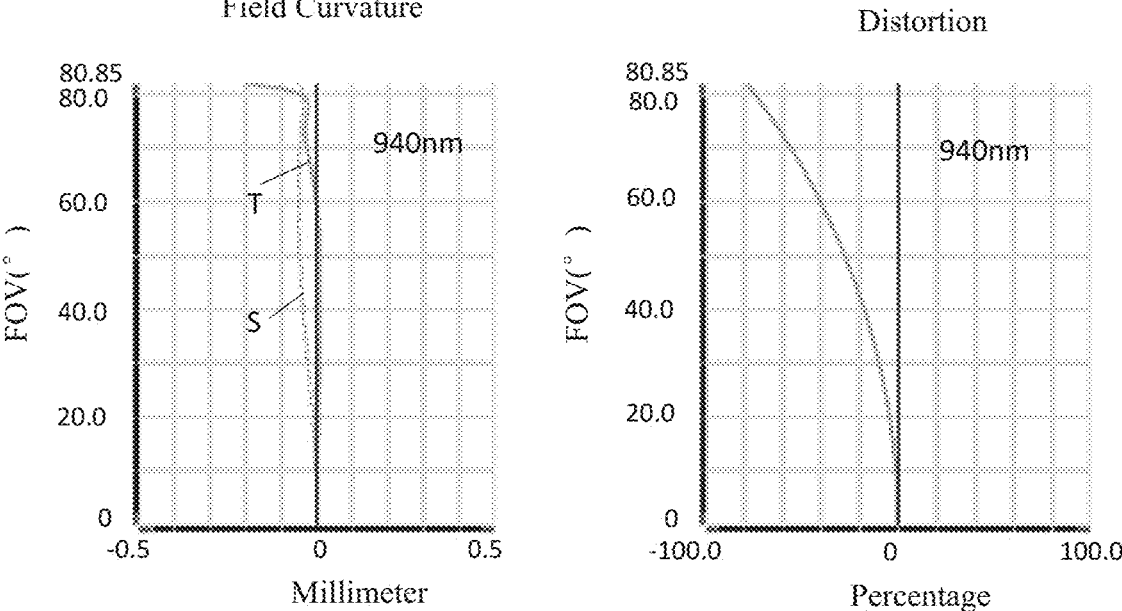
Figure 23:
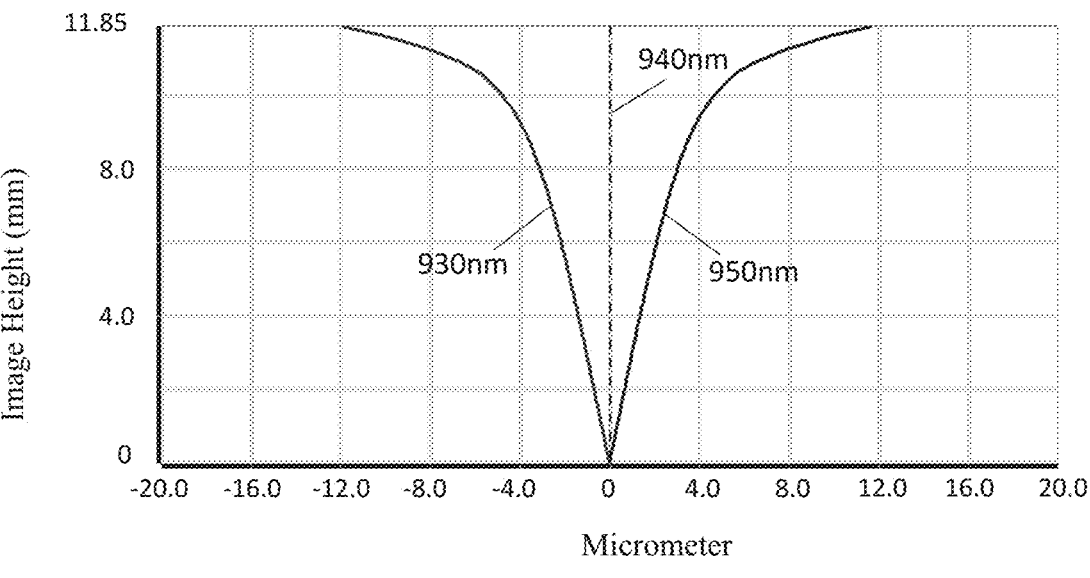
Figure 24:
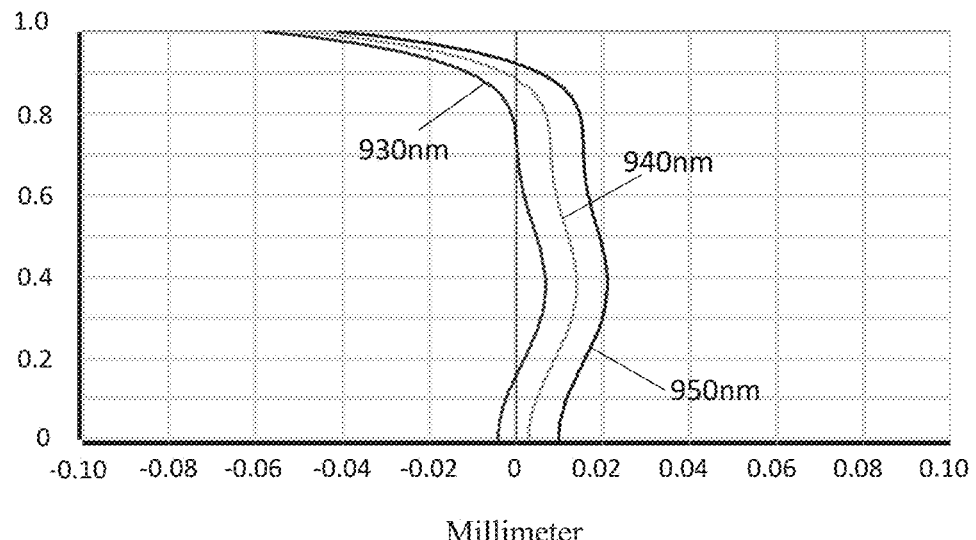

FIG. 18 is a schematic diagram of field curvature and distortion of the camera optical lens shown in FIG. 17;

FIG. 19 is a schematic diagram of lateral color of the camera optical lens shown in FIG. 17;

FIG. 20 is a schematic diagram of longitudinal aberration of the camera optical lens shown in FIG. 17;

FIG. 21 is a structural schematic diagram of a camera optical lens according to a Comparative Example of the present disclosure;

FIG. 22 is a schematic diagram of field curvature and distortion of the camera optical lens shown in FIG. 21;

FIG. 23 is a schematic diagram of lateral color of the camera optical lens shown in FIG. 21; and FIG. 24 is a schematic diagram of longitudinal aberration of the camera optical lens shown in FIG. 21.

DESCRIPTION OF EMBODIMENTS

In order to more clearly illustrate objectives, technical solutions, and advantages of the embodiments of the present disclosure, the technical solutions in the embodiments of the present disclosure are clearly and completely described in details with reference to the accompanying drawings. The described embodiments are merely part of the embodiments of the present disclosure rather than all of the embodiments. All other embodiments obtained by those skilled in the art based on the embodiments of the present disclosure shall fall into the protection scope of the present disclosure.

Embodiment 1

Figure 1:
FIG. 1 is a structural schematic diagram of a camera optical lens according to Embodiment 1 of the present disclosure.

Referring to the drawings, the present disclosure provides a camera optical lens 10. FIG. 1 shows a camera optical lens 10 according to Embodiment 1 of the present disclosure, the camera optical lens 10 includes seven lenses. The camera optical lens 10 includes from an image side to an image side: a first lens L1, a second lens L2, a third lens L3, a fourth lens L4, a fifth lens L5, a sixth lens L6, a beam splitting prism BS, an aperture 51, and a seventh lens L7. An optical element such as an optical filter GF may be provided between a seventh lens L7 and an image surface Si.

In this embodiment, the first lens L1, the second lens L2, the third lens L3, the fourth lens L4, the fifth lens L5, the sixth lens L6, and the seventh lens L7 are all made of glass material.

The first lens L1 is a spherical lens, the second lens L2 is an aspheric lens, the third lens L3 is an aspheric lens, the fourth lens L4 is a spherical lens, the fifth lens L5 is a spherical lens, the sixth lens L6 is a spherical lens, and the seventh lens L7 is an aspheric lens.

In this embodiment, a central curvature radius of an object-side surface of the fourth lens L4 is defined as R7, and a central curvature radius of an image-side surface of the fourth lens L4 is defined as R8, and following relational expression is satisfied: $1.00 \leq R7/R8 \leq 3.00$, which specifies a shape of the fourth lens L4, and can effectively balance the field curvature of the system, so that the field curvature offset of the central field of view is smaller than 0.01 mm.

In this embodiment, a field of view of the camera optical lens 10 is defined as FOV, a f-number of the camera optical lens 10 is defined as FNO, and following relational expressions are satisfied: $80.00 \leq FOV/FNO \leq 120.00$, and within a specified range, a large field of view and a large aperture may be effectively considered. In an embodiment, the following relational expression is satisfied: $FNO \leq 1.35$, and $FOV \geq 108.00$.

In this embodiment, a total optical length from the object-side surface of the first lens to an image plane of the camera optical lens 10 along an optic axis of the camera optical lens 10 is defined as TTL, and an on-axis thickness of the second lens L2 is defined as d3, and following relational expression is satisfied: $10.00 \leq TTL/d3 \leq 20.00$, which specifies a ratio of the total optical length from the object-side surface of the first lens to an image plane of the camera optical lens 10 along an optic axis of the camera optical lens 10 to the on-axis thickness d3 of the second lens L2, and helps to compress the total length of the optical system within the range of the relational expression.

In this embodiment, a focal length of the sixth lens L6 is defined as f6, a focal length of the seventh lens L7 is defined as f7, and a following relational expression is satisfied: $-4.00 \leq f6/f7 \leq -1.00$, which specifies a ratio of the focal length of the sixth lens L6 to the focal length of the seventh lens L7, and the focal length values of the two lenses are close, which helps smooth transition of light and improves image quality.

When the field of view, the aperture value of the camera optical lens 10, the total optical length from the object-side surface of the first lens to an image plane of the camera optical lens 10 along an optic axis of the camera optical lens 10, the thickness of the related lens, the focal length of the related lens, the central curvature radius of the object-side surface of the related lens, and the central curvature radius of the image-side surface of the related lens of the present disclosure satisfy the relational expression, the camera optical lens 10 may satisfy a large aperture and a wide-angle while having good optical performance.

In this embodiment, an on-axis thickness of the third lens L3 is defined as d5, and an on-axis thickness of the fourth lens L4 is defined as d7, and a following relational expression is satisfied: $0.80 \leq d5/d7 \leq 4.00$, which specifies a ratio of the thickness of the third lens L3 to the thickness of the fourth lens L4, and helps to compress the total length of the optical system within the range of the relational expression.

In this embodiment, a central curvature radius of an object-side surface of the first lens L1 is defined as R1, and a central curvature radius of an image-side surface of the first lens L1 is defined as R2, and a following relational expression is satisfied: $1.20 \leq (R1+R2)/(R1-R2) \leq 3.00$, which specifies a shape of the first lens L1, and within the specified range of the relational expression, the deflection degree of light passing through the lens can be mitigated, thereby effectively reducing chromatic aberration, and make the chromatic aberration $|LC| \leq 5.00$ μm.

In this embodiment, a focal length of the fifth lens L5 is defined as f5, a focal length of the camera optical lens 10 is defined as f, and a following relational expression is satisfied: $1.50 \leq f5/f \leq 5.00$, a ratio of the focal length f5 of the fifth lens L5 to the focal length f of the camera optical lens 10 is specified, and the optical focal length is reasonably distributed, so that the system has better imaging quality and lower sensitivity.

In this embodiment, an object-side surface of the first lens L1 is convex in a paraxial region, an image-side surface of the first lens L1 is concave in the paraxial region, and the first lens L1 has a negative refractive power. In other optional embodiments, the object-side surface and the image-side surface of the first lens L1 may also be provided with other concave and convex distribution, and the first lens L1 may also have a positive refractive power.

A focal length of the first lens L1 is defined as f1, and a following relational expression is satisfied: $-5.62 \leq f1/f \leq -1.07$, a ratio of the focal length f1 of the first lens L1 to the focal length f of the camera optical lens 10 is specified, and the refractive power is reasonably distributed, so that the system has better imaging quality and lower sensitivity. In an embodiment, the following relational expression is satisfied: $-3.52 \le f1/f \le -1.34$.

In this embodiment, an on-axis thickness of the first lens L1 is defined as d1, and a following relational expression is satisfied: $0.01 \le d1/TTL \le 0.15$, which specifies a ratio of the on-axis thickness d1 of the first lens L1 to the total optical length from the object-side surface of the first lens to an image plane of the camera optical lens 10 along an optic axis TTL of the camera optical lens 10, and is beneficial to achieving ultra-thin. In an embodiment, the following relational expression is satisfied: $0.01 \le d1/TTL \le 0.12$.

In this embodiment, an object-side surface of the second lens L2 is concave in a paraxial region, an image-side surface of the second lens L2 is convex in the paraxial region, and the second lens L2 has a negative refractive power. In other optional embodiments, the object-side surface and the image-side surface of the second lens L2 may also be provided with other concave and convex distribution, and the second lens L2 may also have a positive refractive power.

In this embodiment, a focal length of the second lens L2 is defined as f2, and a following relational expression is satisfied: $-150.64 \le f2/f \le -2.60$, a ratio of the focal length f2 of the second lens L2 to the focal length f of the camera optical lens 10 is specified, and the refractive power is reasonably distributed, so that the system has better imaging quality and lower sensitivity. In an embodiment, the following relational expression is satisfied: $-94.15 \le f2/f \le -3.25$.

In this embodiment, a central curvature radius of an object-side surface of the second lens L2 is defined as R3, and a central curvature radius of an image-side surface of the second lens L2 is defined as R4, and a following relational expression is satisfied: $-26.46 \le (R3+R4)/(R3-R4) \le -2.45$, a shape of the second lens L2 is specified, and within a specified range, the deflection degree of light passing through the lens can be mitigated, which is beneficial to correcting the aberration of the off-axis angle. In an embodiment, the following relational expression is satisfied: $-16.54 \le (R3+R4)/(R3-R4) \le -3.06$.

In this embodiment, an object-side surface of the third lens L3 is convex in a paraxial region, an image-side surface of the third lens L3 is convex in the paraxial region, and the third lens L3 has a positive refractive power. In other optional embodiments, the object-side surface and the image-side surface of the third lens L3 may also be provided with other concave and convex distributions, and the third lens L3 may also have a negative refractive power.

In this embodiment, a focal length of the third lens L3 is defined as f3, and a following relational expression is satisfied: $0.80 \le f3/f \le 3.50$, a ratio of the focal length f3 of the third lens L3 to the focal length f of the camera optical lens 10 is specified, and the refractive power is reasonably distributed, so that the system has better imaging quality and lower sensitivity. In an embodiment, the following relational expression is satisfied: $1.28 \le f3/f \le 2.80$.

In this embodiment, a central curvature radius of an object-side surface of the third lens L3 is defined as R5, and a central curvature radius of an image-side surface of the third lens L3 is defined as R6, and a following relational expression is satisfied: $0.33 \le (R5+R6)/(R5-R6) \le 1.14$, which specifies a shape of the third lens L3, and within a specified range, the deflection degree of light passing through the lens can be mitigated, which is beneficial to correcting the aberration of the off-axis angle. In an embodiment, the following relational expression is satisfied: $0.52 \le (R5+R6)/(R5-R6) \le 0.91$.

In this embodiment, an on-axis thickness d5 of the third lens L3 and a total optical length from the object-side surface of the first lens to an image plane of the camera optical lens 10 along an optic axis TTL of the camera optical lens 10 satisfy the following relational expression: $0.04 \le d5/TTL \le 0.28$, which specifies a ratio of the on-axis thickness d5 of the third lens L3 to the total optical length from the object-side surface of the first lens to an image plane of the camera optical lens 10 along an optic axis of the camera optical lens 10, which is beneficial to achieving ultra-thin. In an embodiment, the following relational expression is satisfied: $0.07 \le d5/TTL \le 0.22$.

In this embodiment, an object-side surface of the fourth lens L4 is convex in a paraxial region, an image-side surface of the fourth lens L4 is concave in the paraxial region, and the fourth lens L4 has a negative refractive power. In other optional embodiments, the object-side surface and the image-side surface of the fourth lens L4 may also be provided with other concave and convex distributions, and the fourth lens L4 may also have a positive refractive power.

In this embodiment, a focal length f4 of the fourth lens L4 and the focal length f of the camera optical lens 10 satisfy the following relational expression: $-19.73 \le f4/f \le 212.93$, a ratio of the focal length f4 of the fourth lens L4 to the focal length f of the camera optical lens 10 is specified, and the refractive power is reasonably distributed, so that the system has better imaging quality and lower sensitivity. In an embodiment, the following relational expression is satisfied: $-12.33 \le f4/f \le 170.35$.

In this embodiment, an on-axis thickness d7 of the fourth lens L4 and the total optical length from the object-side surface of the first lens to an image plane of the camera optical lens 10 along an optic axis TTL of the camera optical lens 10 satisfy the following relational expression: $0.02 \le d7/TTL \le 0.25$, which specifies a ratio of the on-axis thickness d7 of the fourth lens L4 to the total optical length from the object-side surface of the first lens to an image plane of the camera optical lens 10 along an optic axis TTL of the camera optical lens 10, which is beneficial to achieving ultra-thin. In an embodiment, the following relational expression is satisfied: $0.04 \le d7/TTL \le 0.20$.

In this embodiment, an object-side surface of the fifth lens L5 is concave in a paraxial region, an image-side surface of the fifth lens L5 is convex in the paraxial region, and the fifth lens L5 has a positive refractive power. In other optional embodiments, the object-side surface and the image-side surface of the fifth lens L5 may also be provided with other concave and convex distributions, and the fifth lens L5 may also have negative refractive power.

In this embodiment, a central curvature radius of an object-side surface of the fifth lens L5 is defined as R9, and a central curvature radius of an image-side surface of the fifth lens L5 is defined as R10, a following relational expression is satisfied: $0.18 \le (R9+R10)/(R9-R10) \le 2.37$, which specifies a shape of the fifth lens L5, and within a specified range, the deflection degree of light passing through the lens can be mitigated, which is beneficial to correcting the aberration of the off-axis angle. In an embodiment, the following relational expression is satisfied: $0.29 \le (R9+R10)/(R9-R10) \le 1.89$.

In this embodiment, an on-axis thickness of the fifth lens L5 is defined as d9, and a following relationship is satisfied: $0.02 \le d9/TTL \le 0.11$, which specifies a ratio of the on-axis thickness d9 of the fifth lens L5 to the total optical length from the object-side surface of the first lens to an image plane of the camera optical lens 10 along an optic axis TTL of the camera optical lens 10, which is beneficial to achieving ultra-thin. In an embodiment, the following relational expression is satisfied: $0.04 \leq d9/TTL \leq 0.09$.

In this embodiment, an object-side surface of the sixth lens L6 is convex in a paraxial region, an image-side surface of the sixth lens L6 is concave in the paraxial region, and the sixth lens L6 has a negative refractive power. In other optional embodiments, the object-side surface and the image-side surface of the sixth lens L6 may also be provided with other concave and convex distributions, and the sixth lens L6 may also have a positive refractive power.

In this embodiment, a focal length f6 of the sixth lens L6 and the focal length of the camera optical lens 10 satisfy the following relational expression: $-33.00 \leq f6/f \leq -3.68$, a ratio of the focal length f6 of the sixth lens L6 to the focal length f of the camera optical lens 10 is specified, and the refractive power is reasonably distributed, so that the system has better imaging quality and lower sensitivity. In an embodiment, the following relational expression is satisfied: $-20.62 \leq f6/f \leq -4.60$.

In this embodiment, a central curvature radius of an object-side surface of the sixth lens L6 is defined as R11, and a central curvature radius of an image-side surface of the sixth lens L6 is defined as R12, a following relational expression is satisfied: $-0.53 \leq (R11+R12)/(R11-R12) \leq 8.71$, a shape of the sixth lens L6 is specified, and within a specified range, the deflection degree of light passing through the lens can be mitigated, which is beneficial to correcting the aberration of the off-axis angle. In an embodiment, the following relational expression is satisfied: $-0.33 \leq (R11+R12)/(R11-R12) \leq 6.97$.

In this embodiment, an on-axis thickness of the sixth lens element L6 is defined as d11, and a following relational expression is satisfied: $0.05 \leq d11/TTL \leq 0.22$, which specifies a ratio of the on-axis thickness d11 of the sixth lens L6 to the total optical length from the object-side surface of the first lens to an image plane of the camera optical lens 10 along an optic axis TTL of the camera optical lens 10, which is beneficial to achieving ultra-thin. In an embodiment, the following relational expression is satisfied: $0.08 \leq d11/TTL \leq 0.18$.

In this embodiment, an object-side surface of the seventh lens L7 is convex in a paraxial region, an image-side surface of the seventh lens L7 is concave in the paraxial region, and the seventh lens L7 has a positive refractive power. In other optional embodiments, the object-side surface and the image-side surface of the seventh lens L7 may also be provided with other concave and convex distributions, and the seventh lens L7 may also have a negative refractive power.

In this embodiment, a focal length f7 of the seventh lens L7 and the focal length of the camera optical lens 10 satisfy the following relational expression: $1.66 \leq f7/f \leq 8.62$, a ratio of the focal length f7 of the seventh lens L7 to the focal length f of the camera optical lens 10 is specified, and the refractive power is reasonably distributed, so that the system has better imaging quality and lower sensitivity. In an embodiment, the following relational expression is satisfied: $2.66 \leq f7/f \leq 6.89$.

In this embodiment, a central curvature radius of an object-side surface of the seventh lens L7 is defined as R13, and a central curvature radius of an image-side surface of the seventh lens L7 is defined as R14, a following relational expression is satisfied: $-16.02 \leq (R13+R14)/(R13-R14) \leq -0.65$, a shape of the seventh lens L7 is specified, and within a specified range, the deflection degree of light passing through the lens can be mitigated, thereby effectively reducing aberration. In an embodiment, the following relational expression is satisfied: $-10.01 \leq (R13+R14)/(R13-R14) \leq -0.81$.

In the present embodiment, an on-axis thickness of the seventh lens L7 is defined as d13, and the following relationship is satisfied: $0.02 \leq d13/TTL \leq 0.10$, which specifies a ratio of the on-axis thickness d13 of the seventh lens L7 to the total optical length from the object-side surface of the first lens to an image plane of the camera optical lens 10 along an optic axis TTL of the camera optical lens 10, which is beneficial to achieving ultra-thin. In an embodiment, the following relational expression is satisfied: $0.04 \leq d13/TTL \leq 0.08$.

The camera optical lens 10 of the present disclosure will be described below by way of example. The symbols recited in each example are shown below. The units of the focal length, the on-axis distance, the central curvature radius, the on-axis thickness, and the position of the inflection point are mm.

TTL: the unit of the total optical length (a total optical length from the object-side surface of the first lens L1 to an image plane Si of the camera optical lens 10 along an optic axis) is mm.

In addition, the object-side surface and/or the image-side surface of each lens may also be provided with an inflection point and/or a stationary point, so as to meet high-quality imaging requirements.

Table 1 shows design data of a camera optical lens 10 according to Embodiment 1 of the present disclosure.

TABLE 1

|  | R |  | d |  | nd |  | vd |
|---|---|---|---|---|---|---|---|
| S1 | ∞ | d0 = | −30.433 |  |  |  |  |
| R1 | 35.199 | d1 = | 1.000 | nd1 | 1.9108 | v1 | 35.26 |
| R2 | 10.908 | d2 = | 12.430 |  |  |  |  |
| R3 | −13.570 | d3 = | 4.458 | nd2 | 1.8513 | v2 | 40.10 |
| R4 | −16.647 | d4 = | 1.802 |  |  |  |  |
| R5 | 142.162 | d5 = | 12.203 | nd3 | 1.8513 | v3 | 40.10 |
| R6 | −19.437 | d6 = | 0.300 |  |  |  |  |
| R7 | 28.565 | d7 = | 6.698 | nd4 | 1.9229 | v4 | 20.88 |
| R8 | 18.850 | d8 = | 3.280 |  |  |  |  |
| R9 | −327.865 | d9 = | 3.698 | nd5 | 1.6204 | v5 | 60.37 |
| R10 | −23.572 | d10 = | 0.526 |  |  |  |  |
| R11 | 138.305 | d11 = | 8.322 | nd6 | 1.9108 | v6 | 35.26 |
| R12 | 40.012 | d12 = | 2.728 |  |  |  |  |
| R13 | 26.855 | d13 = | 4.871 | nd7 | 1.8513 | v7 | 40.10 |
| R14 | 314.790 | d14 = | 5.176 |  |  |  |  |
| R15 | ∞ | d15 = | 0.500 | ndg | 1.5115 | vg | 62.57 |
| R16 | ∞ | d16 = | 2.003 |  |  |  |  |

The meaning of each symbol is as follows:

S1: aperture;

R: central curvature radius at the center of the optical surface;

R1: central curvature radius of the object-side surface of the first lens L1;

R2: central curvature radius of the image-side surface of the first lens L1;

R3: central curvature radius of the object-side surface of the second lens L2;

R4: central curvature radius of the image-side surface of the second lens L2;

R5: central curvature radius of the object-side surface of the third lens L3;

R6: central curvature radius of the image-side surface of the third lens L3;

R7: central curvature radius of the object-side surface of the fourth lens L4;

R8: central curvature radius of the image-side surface of the fourth lens L4;

R9: central curvature radius of the object-side surface of the fifth lens L5;

R10: central curvature radius of the image-side surface of the fifth lens L5;

R11: central curvature radius of the object-side surface of the sixth lens L6;

R12: central curvature radius of the image-side surface of the sixth lens L6;

R13: central curvature radius of the object-side surface of the seventh lens L7;

R14: central curvature radius of the image-side surface of the seventh lens L7;

R11: central curvature radius of the object-side surface of the grating filter GF;

R16: central curvature radius of the image-side surface of the grating filter GF;

d: on-axis thickness of lenses, on-axis distance between lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d12: on-axis distance from the image-side surface of the sixth lens L6 to the object-side surface of the seventh lens L7;

d13: on-axis thickness of the seventh lens L7;

d14: on-axis distance from the image-side surface of the seventh lens L7 to the object-side surface of the grating filter GF d15: on-axis thickness of the grating filter GF;

d16: on-axis distance from the image side surface of the grating filter GF to the image plane Si;

nd: refractive index of d line;

nd1: refractive index of d line of the first lens L1;

nd2: refractive index of d line of the second lens L2;

nd3: refractive index of d line of the third lens L3;

nd4: refractive index of d line of the fourth lens L4;

nd5: refractive index of d line of the fifth lens L5;

nd6: refractive index of d line of the sixth lens L6;

nd7: refractive index of d line of the seventh lens L7;

ndg: refractive index of d line of the grating filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the seventh lens L7; and vg: abbe number of the grating filter GF.

Table 2 shows aspheric surface data of the second lens L2, the third lens L3 and the seventh lens L7 in the camera optical lens 10 according to Embodiment 1 of the present disclosure.

TABLE 2

| | Conic Coefficient | Aspherical Coefficient | | | | |
|---|---|---|---|---|---|---|
| | k | A4 | A6 | A8 | A10 | A12 |
| R3 | −5.9952E−01 | 1.7772E−04 | 1.2880E−07 | −2.4366E−08 | 2.9186E−10 | −1.0226E−12 |
| R4 | −6.2832E+00 | 1.7972E−04 | −7.5719E−07 | 8.9642E−10 | 3.5745E−11 | −4.7895E−13 |
| R5 | 6.6803E+01 | 1.9141E−04 | −3.0715E−06 | 3.8172E−08 | −2.9487E−10 | 1.0049E−12 |
| R6 | −1.9047E+00 | −6.8317E−06 | −3.4166E−08 | 1.6779E−09 | −1.2014E−11 | −2.6156E−14 |
| R13 | 1.1745E+00 | 1.0917E−05 | −1.0184E−08 | 1.8445E−09 | −1.4889E−11 | 5.4484E−14 |
| R14 | 4.7068E+01 | 3.8611E−05 | −6.3211E−08 | 3.7266E−09 | −3.0379E−11 | 1.4825E−13 |

| | Conic Coefficient | Aspherical Coefficient | | | | |
|---|---|---|---|---|---|---|
| | k | A14 | A16 | A18 | A20 | A22 |
| R3 | −5.9952E−01 | −1.5823E−14 | 1.4212E−16 | −1.5632E−19 | 2.3335E−22 | −2.1141E−23 |
| R4 | −6.2832E+00 | −5.6966E−16 | 3.7967E−17 | −3.0780E−19 | 1.2721E−21 | −2.2341E−24 |
| R5 | 6.6803E+01 | 3.6387E−15 | −4.4087E−17 | 7.6809E−20 | 4.2907E−22 | −1.4320E−24 |
| R6 | −1.9047E+00 | 1.8327E−15 | −1.6565E−17 | 6.6453E−20 | −9.9012E−23 | −4.5329E−26 |
| R13 | 1.1745E+00 | 6.4201E−17 | −8.9337E−19 | −2.3245E−22 | 1.5680E−23 | −3.0015E−26 |
| R14 | 4.7068E+01 | −3.8316E−16 | 3.6920E−19 | 0.0000E+00 | 0.0000E+00 | 0.0000E+00 | d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;

d11: on-axis thickness of the sixth lens L6;

Wherein k is a conic coefficient, and A4, A6, A8, A10, A12, A14, A16, A18, A20, and A22 are aspheric coefficients.

$$y = \left(x^2/R\right)/\left[1 + \left\{1 - (k+1)\left(x^2/R^2\right)\right\}^{1/2}\right] + A4x^4 + A6x^6 + A8x^8 + \tag{1}$$

$$A10x^{10} + A12x^{12} + A14x^{14} + A16x^{16} + A18x^{18} + A20x^{20} + A22x^{22}$$

Wherein, x is a vertical distance between a point on the aspheric curve and the optical axis, and y is a depth of the aspheric surface (a vertical distance between a point on the aspheric surface at a distance x from the optical axis and a tangent plane tangent to a vertex on the aspheric optical axis).

For convenience, the aspheric surface of each lens surface uses the aspheric surface shown in the above formula (1). However, the present disclosure is not limited to the aspheric polynomial form represented by the formula (1).

Table 3 shows design data of inflection points of each lens in the camera optical lens 10 according to Embodiment 1 of the present disclosure. P1R1 and P1R2 respectively represent the object-side surface and the image-side surface of the first lens L1, P2R1 and P2R2 respectively represent the object-side surface and the image-side surface of the second lens L2, P3R1 and P3R2 respectively represent the object-side surface and the image-side surface of the third lens L3, P4R1 and P4R2 respectively represent the object-side surface and the image-side surface of the fourth lens L4, P5R1 and P5R2 respectively represent the object-side surface and the image-side surface of the fifth lens L5, P6R1 and P6R2 respectively represent the object-side surface and the image-side surface of the fifth lens L6, P7R1 and P7R2 respectively represent the object-side surface and the image-side surface of the fifth lens L7. The corresponding data in the column "inflection point position" is the vertical distance from the inflection point provided with the surface of each lens to the optical axis of the camera optical lens 10.

TABLE 3

| | Number of inflection points | Inflection point position 1 | Inflection point position 2 |
|---|---|---|---|
| P1R1 | 0 | / | / |
| P1R2 | 0 | / | / |
| P2R1 | 0 | / | / |
| P2R2 | 2 | 4.595 | 9.445 |
| P3R1 | 0 | / | / |
| P3R2 | 1 | 10.165 | / |
| P4R1 | 0 | / | / |
| P4R2 | 0 | / | / |
| P5R1 | 0 | / | / |
| P5R2 | 0 | / | / |
| P6R1 | 0 | / | / |
| P6R2 | 0 | / | / |
| P7R1 | 0 | / | / |
| P7R2 | 0 | / | / |

Figure 2:
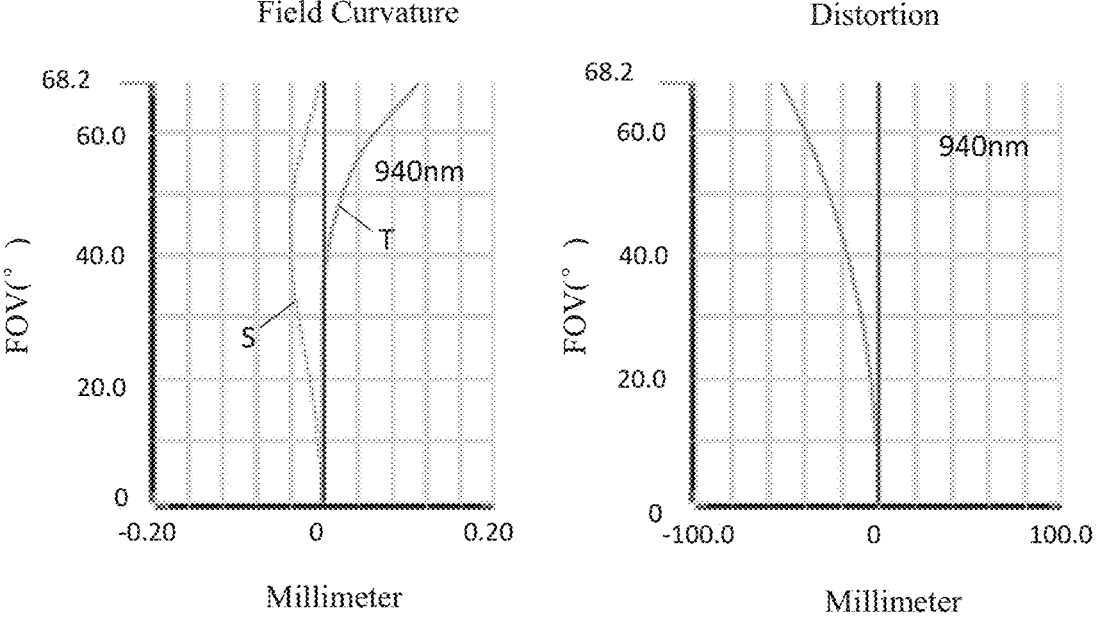
FIG. 2 is a schematic diagram of field curvature and distortion of the camera optical lens shown in FIG. 1.
Figure 3:
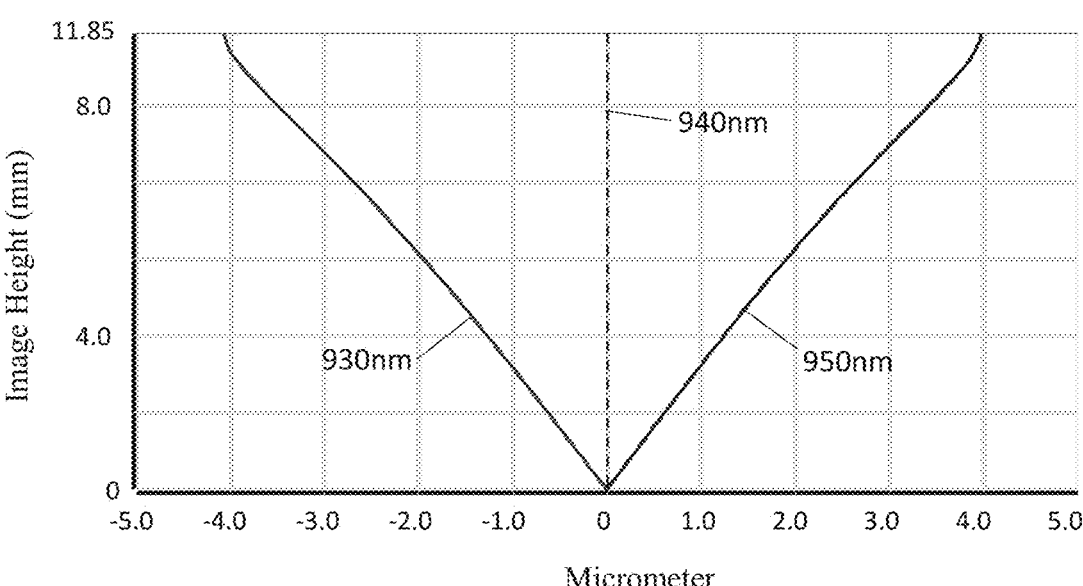
FIG. 3 is a schematic diagram of lateral color of the camera optical lens shown in FIG. 1.
Figure 4:
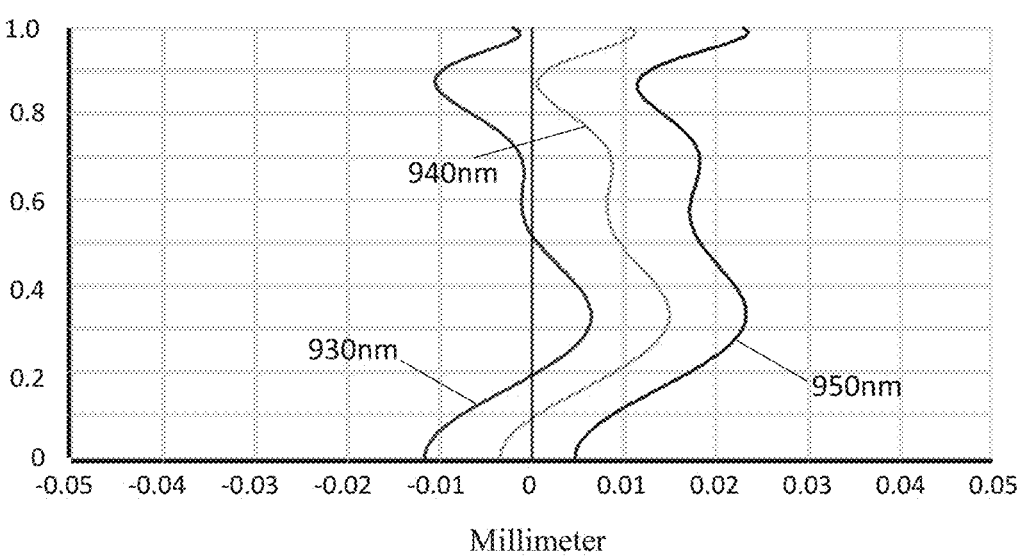
FIG. 4 is a schematic diagram of longitudinal aberration of the camera optical lens shown in FIG. 1.

FIG. 2 shows field curvature and distortion of light with a wavelength of 940 nm after passing through the camera optical lens 10. The field curvature S in FIG. 2 is the field curvature in a sagittal direction, and T is the field curvature in a meridional direction. FIG. 3 and FIG. 4 respectively show lateral color and longitudinal aberration of light with wavelengths 930 nm, 940 nm and 950 nm after passing through the camera optical lens 10. As shown in Table 22, Embodiment 1 satisfies each relational expression.

In this embodiment, the entrance pupil diameter ENPD of the camera optical lens 10 is 7.444 mm, the full field of view image height IH in a diagonal direction is 11.851 mm, and the field of view FOV in the diagonal direction is 136.35°, so that the camera optical lens 10 meets the design requirements of a large aperture, a wide-angle, and an ultra-thin, and the on-axis and off-axis chromatic aberration thereof is sufficiently compensated for, and it has good optical characteristics.

Embodiment 2

Figure 5:
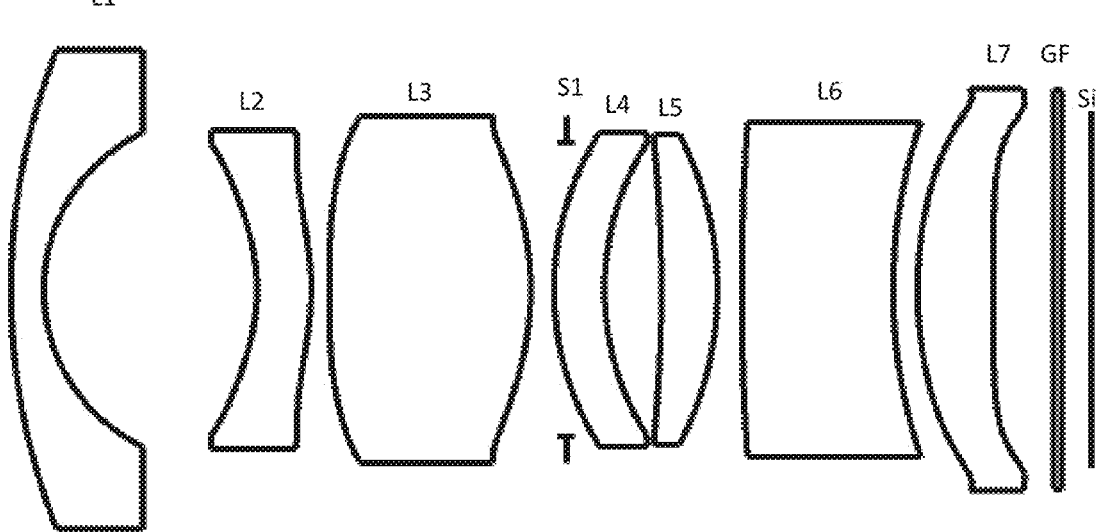
FIG. 5 is a structural schematic diagram of a camera optical lens according to Embodiment 2 of the present disclosure.

FIG. 5 is a structural schematic diagram of a camera optical lens 20 in Embodiment 2, Embodiment 2 is substantially the same as Embodiment 1, and the symbol meaning thereof is also the same as that of Embodiment 1, so the same parts are not described herein again, and only differences are listed below.

In this embodiment, the fourth lens L4 has a positive refractive power.

Table 4 shows design data of a camera optical lens 20 according to Embodiment 2 of the present disclosure.

TABLE 4

| | R | d | nd | | vd | |
|---|---|---|---|---|---|---|
| S1 | ∞ | d0 = −36.769 | | | | |
| R1 | 42.941 | d1 = 2.174 | nd1 | 1.9108 | v1 | 35.26 |
| R2 | 11.537 | d2 = 14.130 | | | | |
| R3 | −12.731 | d3 = 3.578 | nd2 | 1.8513 | v2 | 40.10 |
| R4 | −17.172 | d4 = 1.193 | | | | |
| R5 | 134.046 | d5 = 13.346 | nd3 | 1.8513 | v3 | 40.10 |
| R6 | −19.709 | d6 = 1.541 | | | | |
| R7 | 19.370 | d7 = 3.344 | nd4 | 1.9229 | v4 | 20.88 |
| R8 | 18.101 | d8 = 3.766 | | | | |
| R9 | −99.034 | d9 = 3.713 | nd5 | 1.6204 | v5 | 60.37 |
| R10 | −22.173 | d10 = 1.605 | | | | |
| R11 | 163.868 | d11 = 10.021 | nd6 | 1.9108 | v6 | 35.26 |
| R12 | 34.349 | d12 = 1.628 | | | | |
| R13 | 27.004 | d13 = 5.008 | nd7 | 1.8513 | v7 | 40.10 |
| R14 | 1168.973 | d14 = 4.006 | | | | |
| R15 | ∞ | d15 = 0.500 | ndg | 1.5115 | vg | 62.57 |
| R16 | ∞ | d16 = 2.007 | | | | |

Table 5 shows aspheric surface data of the second lens L2, the third lens L3 and the seventh lens L7 in the camera optical lens 20 according to Embodiment 2 of the present disclosure.

TABLE 5

| | Conic Coefficient | Aspherical Coefficient | | | | |
|---|---|---|---|---|---|---|
| | k | A4 | A6 | A8 | A10 | A12 |
| R3 | 1.6917E−04 | 1.7692E−07 | −2.4007E−08 | 2.8461E−10 | −1.0595E−12 | −1.5390E−14 |
| R4 | 1.8189E−04 | −7.8198E−07 | 9.2219E−10 | 3.7618E−11 | −4.5773E−13 | −5.4247E−16 |
| R5 | 1.9804E−04 | −3.0043E−06 | 3.8300E−08 | −2.9209E−10 | 9.7528E−13 | 3.5840E−15 |
| R6 | −3.4506E−06 | 2.3379E−08 | 1.8764E−09 | −1.1707E−11 | 2.6191E−14 | 1.8585E−15 |
| R13 | 1.8924E−07 | −3.9021E−08 | 2.9304E−09 | −2.2202E−11 | 6.2637E−14 | 2.7756E−16 |
| R14 | 4.0499E−05 | 3.3921E−08 | 4.9714E−09 | −3.0062E−11 | 1.6229E−13 | −2.9761E−16 |

| | Conic Coefficient | Aspherical Coefficient | | | | |
|---|---|---|---|---|---|---|
| | k | A14 | A16 | A18 | A20 | A22 |
| R3 | 1.6917E−04 | 1.4947E−16 | −1.0082E−19 | 2.1288E−22 | −2.4487E−23 | −2.4487E−23 |
| R4 | 1.8189E−04 | 3.7769E−17 | −3.1153E−19 | 1.2342E−21 | −2.3506E−24 | −2.3506E−24 |

TABLE 5-continued

| | | | | | |
|---|---|---|---|---|---|
| R5 | 1.9804E−04 | −4.3447E−17 | 7.8916E−20 | 4.0173E−22 −1.3506E−24 | −1.3506E−24 |
| R6 | −3.4506E−06 | −1.6147E−17 | 6.9730E−20 | −7.8297E−23 −6.0283E−26 | −6.0283E−26 |
| R13 | 1.8924E−07 | −1.0804E−18 | −1.1641E−20 | 4.1431E−23 −1.6543E−25 | −1.6543E−25 |
| R14 | 4.0499E−05 | 1.0143E−18 | −1.1549E−23 | −4.4053E−23 −6.7661E−25 | −6.7661E−25 |

Table 6 shows design data of inflection points of each lens in the camera optical lens 20 according to Embodiment 2 of the present disclosure.

TABLE 6

| | Number of inflection points | Inflection point position 1 | Inflection point position 2 |
|---|---|---|---|
| P1R1 | 0 | / | / |
| P1R2 | 0 | / | / |
| P2R1 | 0 | / | / |
| P2R2 | 2 | 4.475 | 9.685 |
| P3R1 | 0 | / | / |
| P3R2 | 1 | 8.895 | / |
| P4R1 | 0 | / | / |
| P4R2 | 0 | / | / |
| P5R1 | 0 | / | / |
| P5R2 | 0 | / | / |
| P6R1 | 0 | / | / |
| P6R2 | 0 | / | / |
| P7R1 | 0 | / | / |
| P7R2 | 0 | / | / |

Figure 6:
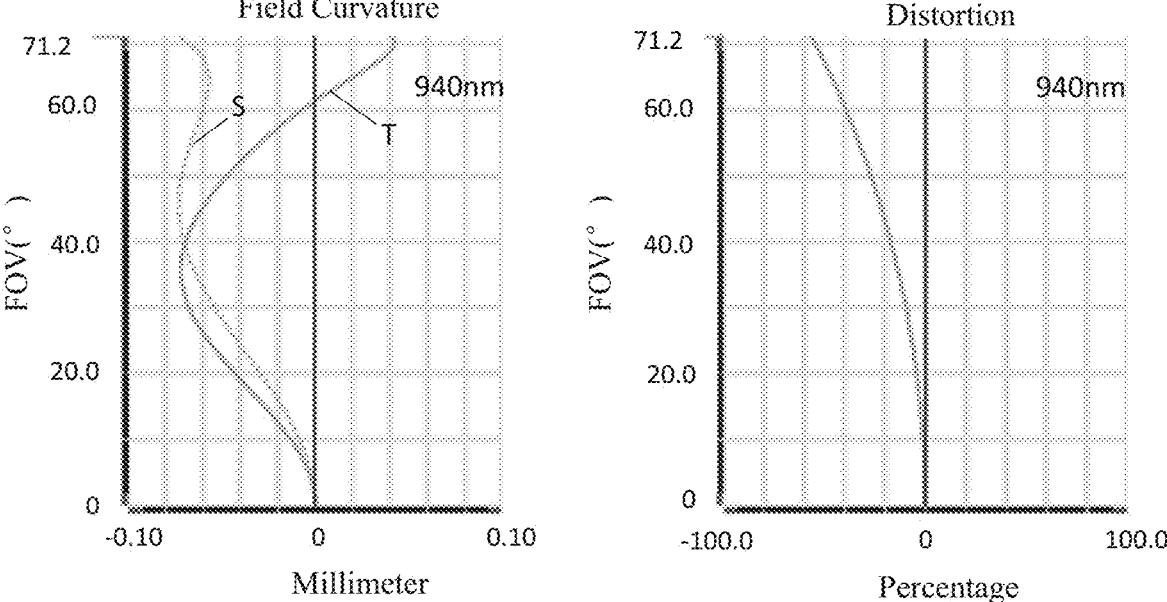
FIG. 6 is a schematic diagram of field curvature and distortion of the camera optical lens shown in FIG. 5.
Figure 7:
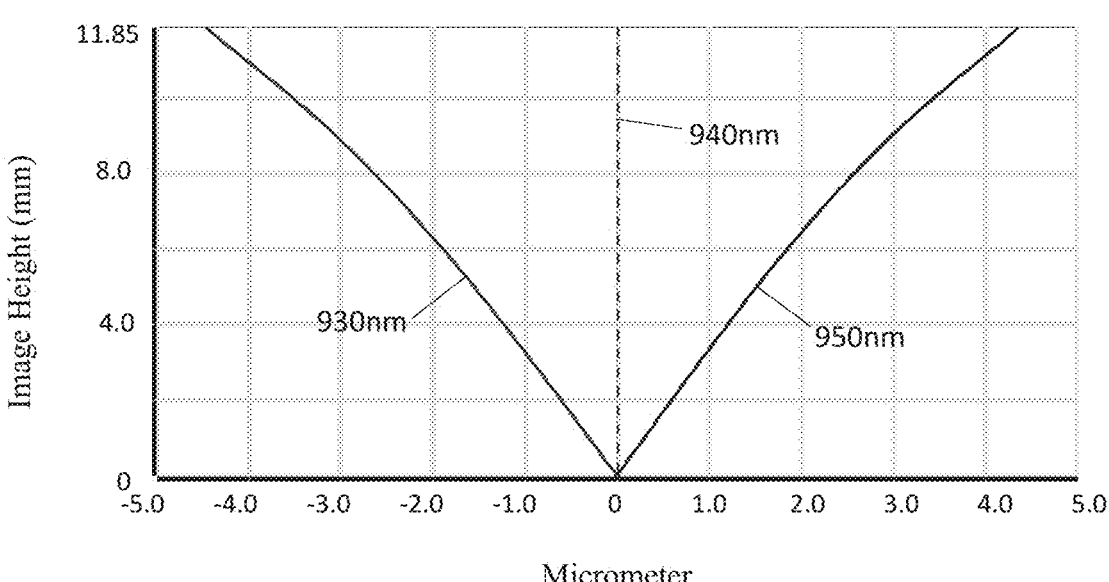
FIG. 7 is a schematic diagram of lateral color of the camera optical lens shown in FIG. 5.
Figure 8:
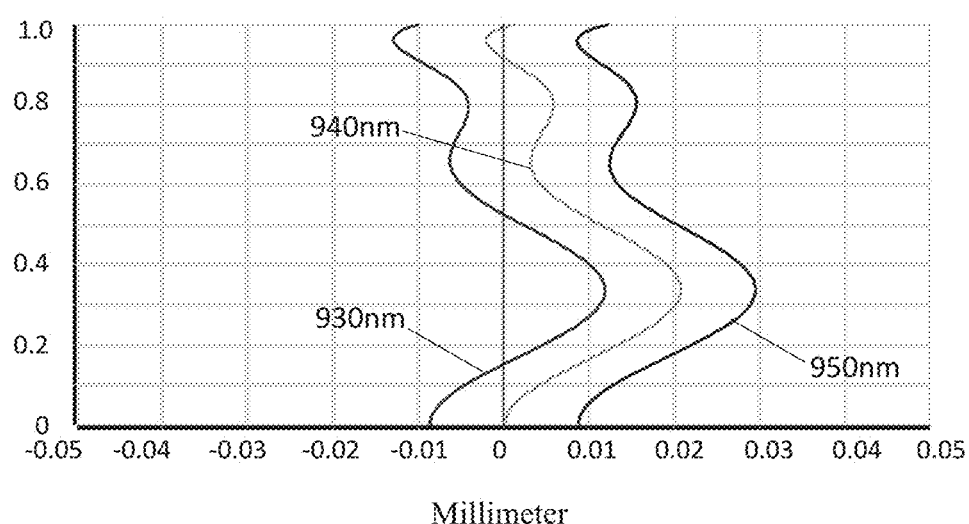
FIG. 8 is a schematic diagram of longitudinal aberration of the camera optical lens shown in FIG. 5.

FIG. 6 shows field curvature and distortion of light with a wavelength of 940 nm after passing through the camera optical lens 20. The field curvature S in FIG. 6 is the field curvature in a sagittal direction, and T is the field curvature in a meridional direction. FIG. 7 and FIG. 8 respectively show lateral color and longitudinal aberration of light with wavelengths 930 nm, 940 nm and 950 nm after passing through the camera optical lens 20. As shown in Table 22, Embodiment 2 satisfies each relational expression.

In this embodiment, the entrance pupil diameter ENPD of the camera optical lens 20 is 6.829 mm, the full field of view image height IH in a diagonal direction is 11.851 mm, and the field of view FOV in a diagonal direction is 142.36°, so that the camera optical lens 20 meets the design requirements of a large aperture, a wide-angle, and an ultra-thin, and the on-axis and off-axis chromatic aberration thereof is sufficiently compensated for, and it has good optical characteristics.

Embodiment 3

Figure 9:
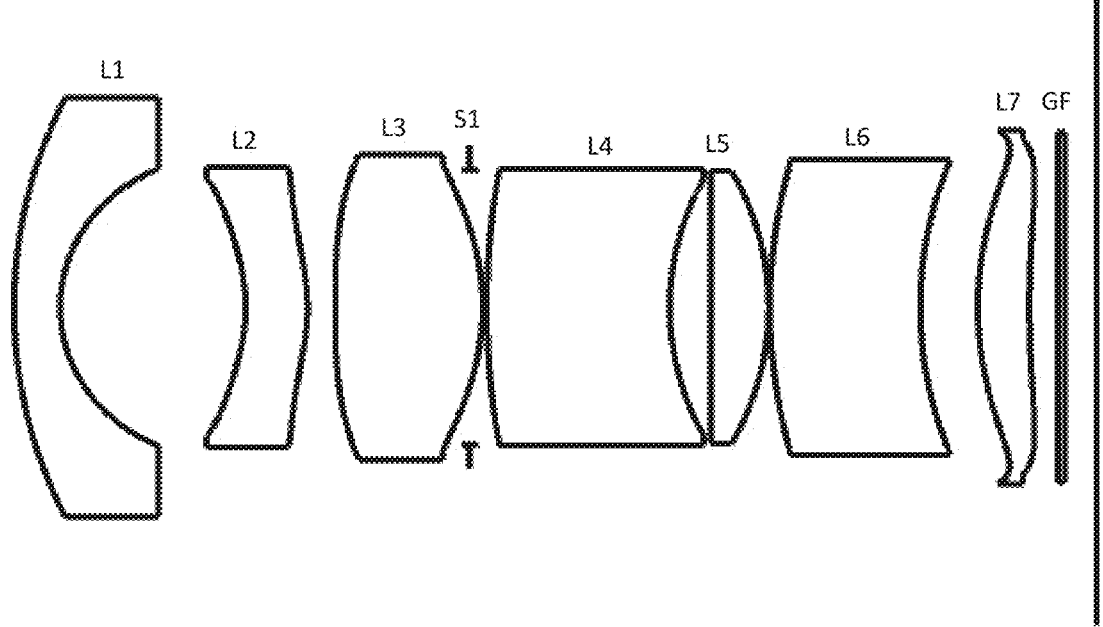
FIG. 9 is a structural schematic diagram of a camera optical lens according to Embodiment 3 of the present disclosure.

FIG. 9 is a structural schematic diagram of a camera optical lens 30 in Embodiment 3, Embodiment 3 is substantially the same as Embodiment 1, and the symbol meaning is the same as that of Embodiment 1, so the same parts are not described herein again, and only differences are listed below.

Table 7 shows design data of the camera optical lens 30 according to Embodiment 3 of the present disclosure.

TABLE 7

| | R | d | nd | | vd | |
|---|---|---|---|---|---|---|
| S1 | ∞ | d0 = −32.205 | | | | |
| R1 | 36.394 | d1 = 3.260 | nd1 | 1.9108 | v1 | 35.26 |
| R2 | 11.290 | d2 = 13.105 | | | | |
| R3 | −14.055 | d3 = 4.365 | nd2 | 1.8513 | v2 | 40.10 |
| R4 | −16.353 | d4 = 1.945 | | | | |
| R5 | 139.576 | d5 = 10.434 | nd3 | 1.8513 | v3 | 40.10 |
| R6 | −19.146 | d6 = 0.299 | | | | |
| R7 | 61.552 | d7 = 12.914 | nd4 | 1.9229 | v4 | 20.88 |
| R8 | 20.572 | d8 = 2.894 | | | | |
| R9 | −2470.731 | d9 = 4.101 | nd5 | 1.6204 | v5 | 60.37 |
| R10 | −21.344 | d10 = 0.097 | | | | |
| R11 | 42.323 | d11 = 10.605 | nd6 | 1.9108 | v6 | 35.26 |
| R12 | 29.886 | d12 = 4.077 | | | | |
| R13 | 26.395 | d13 = 3.639 | nd7 | 1.8513 | v7 | 40.10 |
| R14 | 73.550 | d14 = 2.000 | | | | |
| R15 | ∞ | d15 = 0.500 | ndg | 1.5115 | vg | 62.57 |
| R16 | ∞ | d16 = 2.259 | | | | |

Table 8 shows aspheric surface data of the second lens L2, the third lens L3 and the seventh lens L7 in the camera optical lens 30 according to Embodiment 3 of the present disclosure.

TABLE 8

| | Conic Coefficient | Aspherical Coefficient | | | | |
|---|---|---|---|---|---|---|
| | k | A4 | A6 | A8 | A10 | A12 |
| R3 | −6.0608E−01 | 1.7556E−04 | 1.1899E−07 | −2.4527E−08 | 2.9002E−10 | −1.0715E−12 |
| R4 | −5.8800E+00 | 1.7676E−04 | −7.6896E−07 | 6.3687E−10 | 3.3271E−11 | −5.0201E−13 |
| R5 | 6.6018E+01 | 1.9072E−04 | −3.0756E−06 | 3.8144E−08 | −2.9483E−10 | 1.0070E−12 |
| R6 | −1.8518E+00 | −6.7728E−06 | −3.5831E−08 | 1.6903E−09 | −1.1692E−11 | −2.3590E−14 |
| R13 | 7.7772E−01 | −1.4565E−05 | −7.1650E−08 | 1.2523E−09 | −1.6425E−11 | 5.1145E−14 |
| R14 | −2.7858E+01 | −9.3631E−06 | −2.0526E−07 | 2.4088E−09 | −2.9578E−11 | 1.3595E−13 |

| | Conic Coefficient | Aspherical Coefficient | | | | |
|---|---|---|---|---|---|---|
| | k | A14 | A16 | A18 | A20 | A22 |
| R3 | −6.0608E−01 | −1.6058E−14 | 1.4484E−16 | −3.7415E−19 | 6.8084E−21 | −7.5842E−23 |
| R4 | −5.8800E+00 | −4.2868E−16 | 3.8824E−17 | −3.0396E−19 | 1.1856E−21 | −2.7105E−24 |
| R5 | 6.6018E+01 | 3.6625E−15 | −4.3965E−17 | 7.6987E−20 | 4.2576E−22 | −1.5442E−24 |

TABLE 8-continued

| | | | | | | |
|---|---|---|---|---|---|---|
| R6 | −1.8518E+00 | 1.8521E−15 | −1.6404E−17 | 6.6934E−20 | −1.0266E−22 | −1.7188E−25 |
| R13 | 7.7772E−01 | 2.8938E−17 | −1.1787E−18 | −2.2398E−21 | 4.9401E−24 | −5.2167E−26 |
| R14 | −2.7858E+01 | −4.2153E−16 | 2.7776E−19 | 2.9812E−22 | 4.3347E−24 | −6.6380E−26 |

Table 9 shows design data of inflection points of each lens in the camera optical lens 30 according to Embodiment 3 of the present disclosure.

TABLE 9

| | Number of inflection points | Inflection point position 1 | Inflection point position 2 |
|---|---|---|---|
| P1R1 | 0 | / | / |
| P1R2 | 0 | / | / |
| P2R1 | 0 | / | / |
| P2R2 | 2 | 4.725 | 8.875 |
| P3R1 | 1 | 11.835 | / |
| P3R2 | 1 | 9.925 | / |
| P4R1 | 0 | / | / |
| P4R2 | 0 | / | / |
| P5R1 | 0 | / | / |
| P5R2 | 0 | / | / |
| P6R1 | 0 | / | / |
| P6R2 | 0 | / | / |
| P7R1 | 1 | 9.575 | / |
| P7R2 | 1 | 6.235 | / |

Table 10 shows stationary point design data of each lens in the camera optical lens 30 according to Embodiment 3 of the present disclosure. Wherein, P1R1 and P1R2 respectively represent the object-side surface and the image-side surface of the first lens L1, P2R1 and P2R2 respectively represent the object-side surface and the image-side surface of the second lens L2, P3R1 and P3R2 respectively represent the object-side surface and the image-side surface of the third lens L3, P4R1 and P4R2 respectively represent the object-side surface and the image-side surface of the fourth lens L4, P5R1 and P5R2 respectively represent the object-side surface and the image-side surface of the fifth lens L5, P6R1 and P6R2 respectively represent the object-side surface and the image-side surface of the fifth lens L6, P7R1 and P7R2 respectively represent the object-side surface and the image-side surface of the fifth lens L7. The corresponding data in the column "stationary point position" is a vertical distance from the stationary point provided with the surface of each lens to the optical axis of the camera optical lens 30. The unit of stationary point location is mm.

TABLE 10

| | Number of stationary points | Stationary point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |
| P7R1 | 1 | 11.945 |
| P7R2 | 1 | 9.375 |

Figure 10:
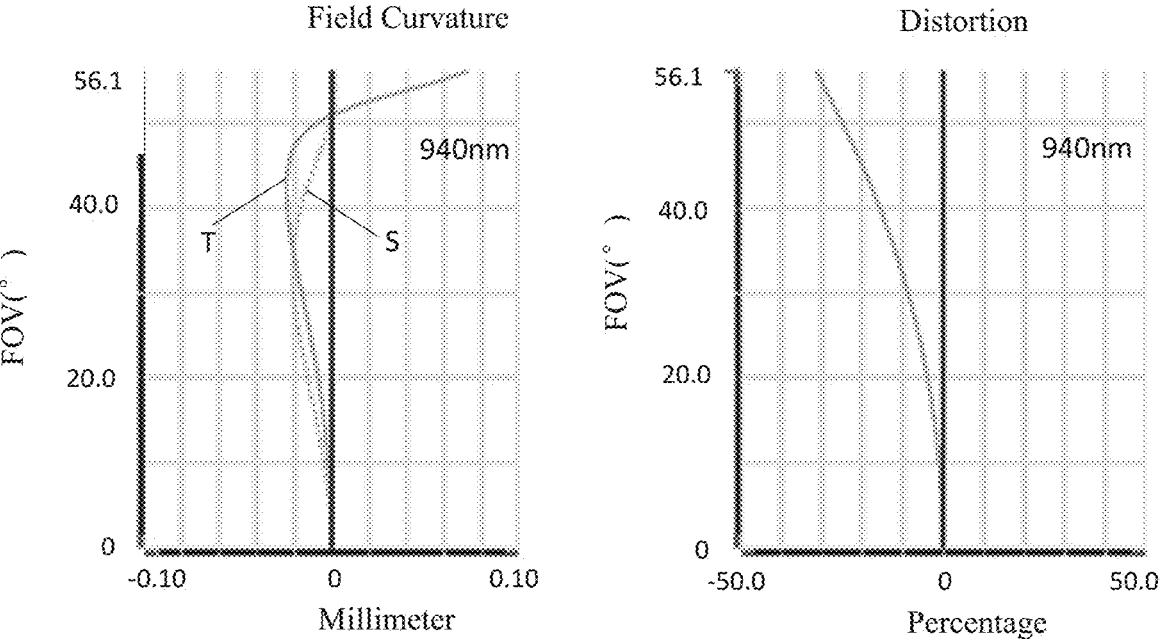
FIG. 10 is a schematic diagram of field curvature and distortion of the camera optical lens shown in FIG. 9.
Figure 11:
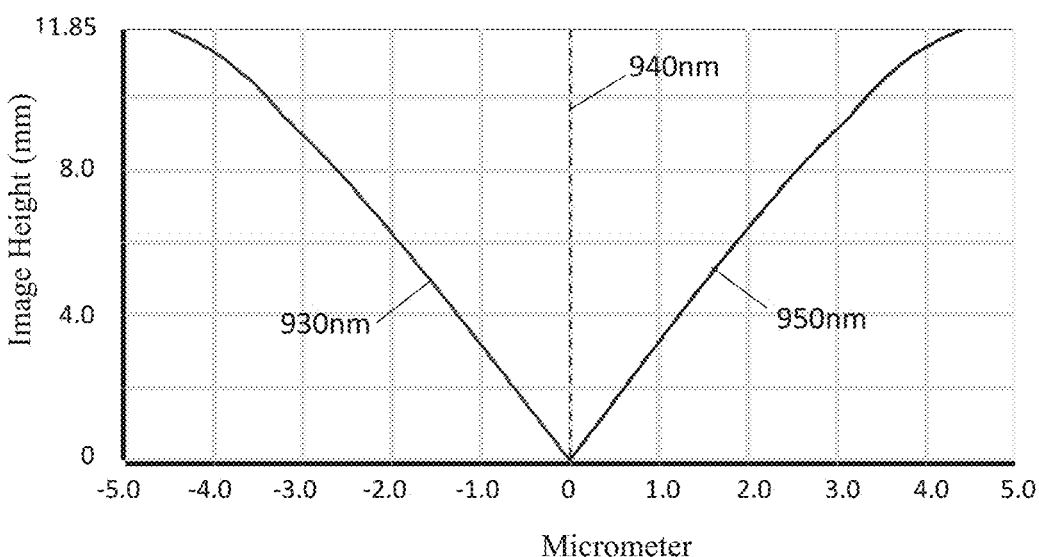
FIG. 11 is a schematic diagram of lateral color of the camera optical lens shown in FIG. 9.
Figure 12:
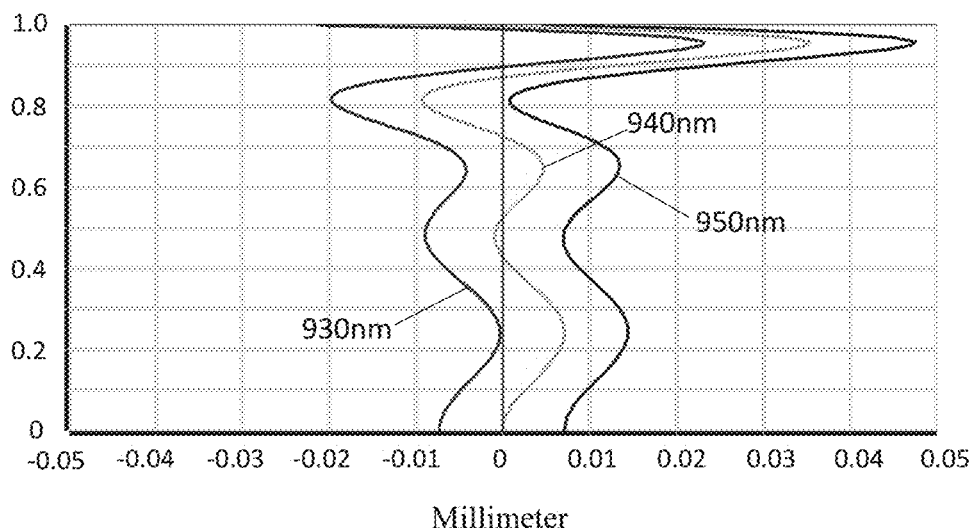
FIG. 12 is a schematic diagram of longitudinal aberration of the camera optical lens shown in FIG. 9.

FIG. 10 shows field curvature and distortion of light with a wavelength of 940 nm after passing through the camera optical lens 30. The field curvature S in FIG. 10 is the field curvature in a sagittal direction, and T is the field curvature in a meridional direction. FIG. 11 and FIG. 12 respectively show lateral color and longitudinal aberration of light with wavelengths 930 nm, 940 nm and 950 nm after passing through the camera optical lens 30.

As shown in Table 22, Embodiment 3 satisfies each relational expression.

In this embodiment, the entrance pupil diameter ENPD of the camera optical lens 30 is 8.59 mm, the full field of view image height IH in a diagonal direction is 11.851 mm, and the field of view FOV in a diagonal direction is 112.15°, so that the camera optical lens 30 meets the design requirements of a large aperture, a wide-angle, and an ultra-thin, and the on-axis and off-axis chromatic aberration thereof is sufficiently compensated for, and it has good optical characteristics.

Embodiment 4

Figure 13:
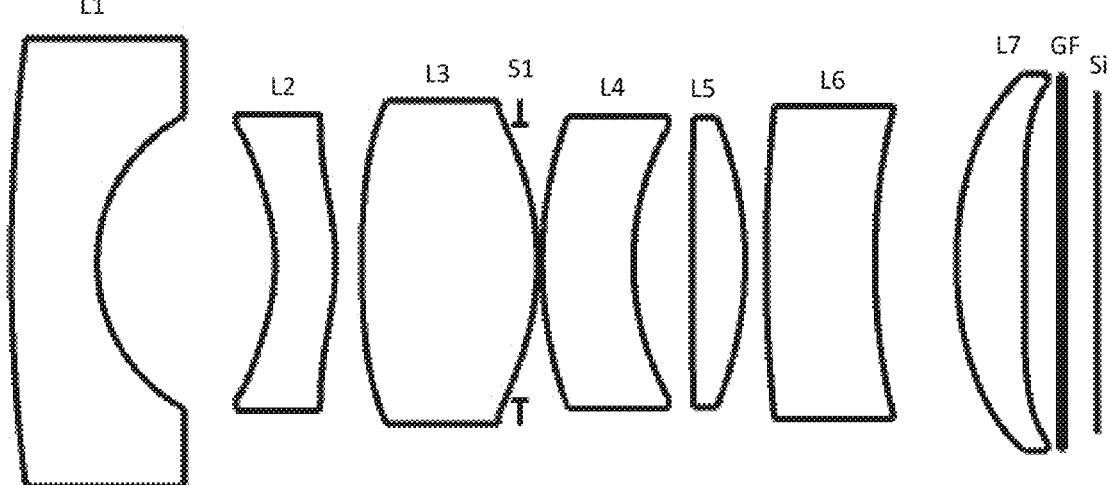
FIG. 13 is a structural schematic diagram of a camera optical lens according to Embodiment 4 of the present disclosure.

FIG. 13 is a structural schematic diagram of a camera optical lens 40 in Embodiment 4, Embodiment 4 is substantially the same as Embodiment 1, and the symbols are the same as those in Embodiment 1, so the same parts are not described herein again, and only differences are listed below.

In this embodiment, an object-side surface of the fifth lens L5 is convex in a paraxial region, and an image-side surface of the seventh lens L7 is convex in the paraxial region.

Table 11 shows design data of the camera optical lens 40 according to Embodiment 4 of the present disclosure.

TABLE 11

| | R | d | | nd | | vd |
|---|---|---|---|---|---|---|
| S1 | ∞ | d0 = −36.211 | | | | |
| R1 | 120.996 | d1 = 6.110 | nd1 | 1.9108 | v1 | 35.26 |
| R2 | 11.805 | d2 = 12.666 | | | | |
| R3 | −13.912 | d3 = 4.296 | nd2 | 1.8513 | v2 | 40.10 |
| R4 | −16.534 | d4 = 1.881 | | | | |
| R5 | 139.406 | d5 = 12.473 | nd3 | 1.8513 | v3 | 40.10 |
| R6 | −19.403 | d6 = 0.330 | | | | |
| R7 | 29.924 | d7 = 6.480 | nd4 | 1.9229 | v4 | 20.88 |
| R8 | 19.729 | d8 = 4.195 | | | | |
| R9 | 648.079 | d9 = 3.756 | nd5 | 1.6204 | v5 | 60.37 |
| R10 | −26.724 | d10 = 1.511 | | | | |
| R11 | 110.909 | d11 = 7.717 | nd6 | 1.9108 | v6 | 35.26 |
| R12 | 45.658 | d12 = 5.804 | | | | |
| R13 | 26.450 | d13 = 4.828 | nd7 | 1.8513 | v7 | 40.10 |
| R14 | −2021.453 | d14 = 2.423 | | | | |
| R15 | ∞ | d15 = 0.500 | ndg | 1.5115 | vg | 62.57 |
| R16 | ∞ | d16 = 2.240 | | | | |

Table 12 shows aspheric surface data of the second lens L2, the third lens L3 and the seventh lens L7 in the camera optical lens 40 according to Embodiment 4 of the present disclosure.

TABLE 12

| | Conic Coefficient | Aspherical Coefficient | | | | |
|---|---|---|---|---|---|---|
| | k | A4 | A6 | A8 | A10 | A12 |
| R3 | −5.8282E−01 | 1.7530E−04 | 1.3685E−07 | −2.5253E−08 | 2.8816E−10 | −9.8975E−13 |
| R4 | −6.1645E+00 | 1.7958E−04 | −7.4911E−07 | 9.5078E−10 | 3.5110E−11 | −4.6908E−13 |
| R5 | 7.9412E+01 | 1.9214E−04 | −3.0681E−06 | 3.8245E−08 | −2.9477E−10 | 1.0048E−12 |
| R6 | −1.9105E+00 | −6.5506E−06 | −3.3295E−08 | 1.6966E−08 | −1.1890E−11 | −2.4750E−14 |
| R13 | 9.3058E−01 | 6.6416E−06 | −2.7257E−08 | 1.9636E−09 | −1.4963E−11 | 5.5525E−14 |
| R14 | 9.0003E+01 | 3.5874E−05 | −7.1423E−08 | 3.7481E−09 | −2.9916E−11 | 1.5067E−13 |

| | Conic Coefficient | Aspherical Coefficient | | | | |
|---|---|---|---|---|---|---|
| | k | A14 | A16 | A18 | A20 | A22 |
| R3 | −5.8282E−01 | −1.5571E−14 | 1.4574E−16 | −1.3859E−19 | 1.1130E−21 | −4.5876E−23 |
| R4 | −6.1645E+00 | −5.0875E−16 | 3.8237E−17 | −3.0828E−19 | 1.2374E−21 | −3.0521E−24 |
| R5 | 7.9412E+01 | 3.6301E−15 | −4.4061E−17 | 7.6797E−20 | 4.2755E−22 | −1.4349E−24 |
| R6 | −1.9105E+00 | 1.8408E−15 | −1.6521E−17 | 6.6591E−20 | −9.9215E−23 | −5.9478E−26 |
| R13 | 9.3058E−01 | 6.5288E−17 | −8.8704E−19 | −3.1484E−22 | 1.4998E−23 | −3.1841E−26 |
| R14 | 9.0003E+01 | −3.8231E−16 | 3.9212E−19 | 1.2111E−22 | 9.1818E−25 | 6.6613E−27 |

Table 13 and Table 14 show design data of inflection points and stationary points of each lens in the camera optical lens 40 according to Embodiment 4 of the present disclosure.

TABLE 13

| | Number of inflection points | Inflection point position 1 | Inflection point position 2 |
|---|---|---|---|
| P1R1 | 0 | / | / |
| P1R2 | 0 | / | / |
| P2R1 | 0 | / | / |
| P2R2 | 2 | 4.615 | 9.425 |
| P3R1 | 0 | / | / |
| P3R2 | 1 | 9.945 | / |
| P4R1 | 0 | / | / |
| P4R2 | 0 | / | / |
| P5R1 | 0 | / | / |
| P5R2 | 0 | / | / |
| P6R1 | 0 | / | / |
| P6R2 | 0 | / | / |
| P7R1 | 0 | / | / |
| P7R2 | 1 | 1.075 | / |

TABLE 14

| | Number of stationary points | Stationary point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |
| P7R1 | 0 | / |
| P7R2 | 1 | 1.865 |

Figure 14:
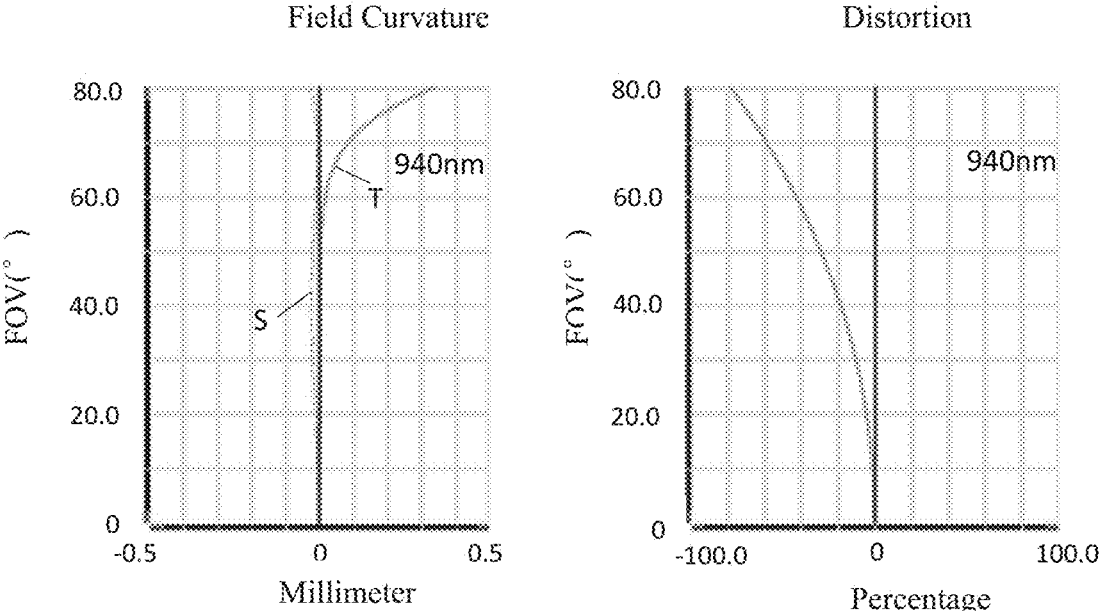
FIG. 14 is a schematic diagram of field curvature and distortion of the camera optical lens shown in FIG. 13.
Figure 15:
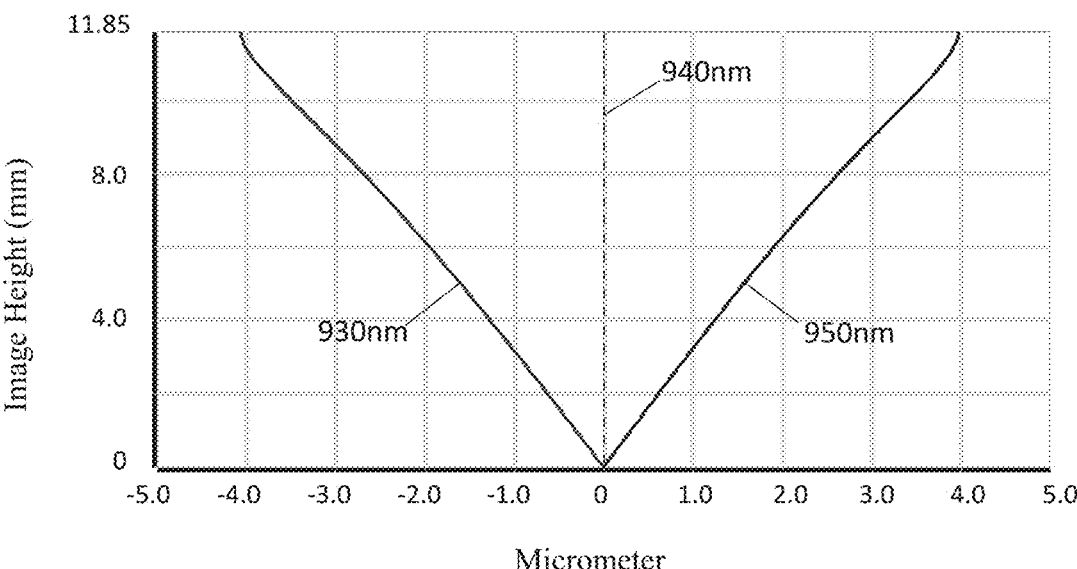
FIG. 15 is a schematic diagram of lateral color of the camera optical lens shown in FIG. 13.
Figure 16:
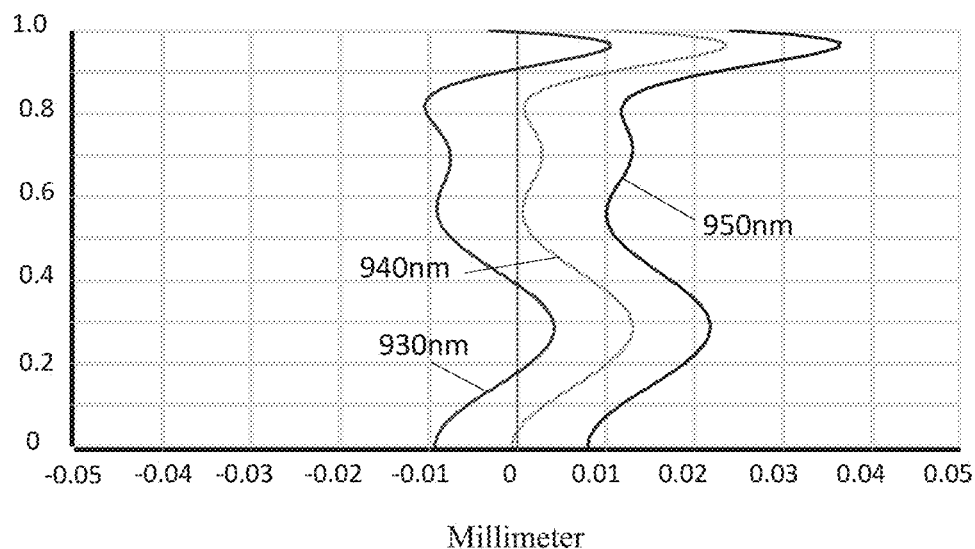
FIG. 16 is a schematic diagram of longitudinal aberration of the camera optical lens shown in FIG. 13.

FIG. 14 shows field curvature and distortion of light with a wavelength of 940 nm after passing through the camera optical lens 40. The field curvature S in FIG. 14 is the field curvature in a sagittal direction, and T is the field curvature in a meridional direction. FIG. 15 and FIG. 16 respectively show lateral color and longitudinal aberration of light with wavelengths 930 nm, 940 nm and 950 nm after passing through the camera optical lens 40.

As shown in Table 22, Embodiment 4 satisfies each relational expression.

In this embodiment, the entrance pupil diameter ENPD of the camera optical lens 40 is 7.001 mm, the full field of view image height IH in a diagonal direction is 11.851 mm, and the field of view FOV in a diagonal direction is 160.77°, so that the camera optical lens 40 meets the design requirements of a large aperture, a wide-angle, and an ultra-thin, and the on-axis and off-axis chromatic aberration thereof is sufficiently compensated for, and it has good optical characteristics.

Embodiment 5

FIG. 17 is a structural schematic diagram of a camera optical lens 50 in Embodiment 5, Embodiment 5 is substantially the same as Embodiment 1 and the symbols are the same as those in Embodiment 1, so the same parts are not described herein again, and only differences are listed below.

In this embodiment, an object-side surface of the fifth lens L5 is convex in a paraxial region, and an object-side surface of the sixth lens L6 is concave in the paraxial region.

Table 15 shows design data of the camera optical lens 50 according to Embodiment 5 of the present disclosure.

TABLE 15

| | R | d | | nd | | vd |
|---|---|---|---|---|---|---|
| S1 | ∞ | d0 = | −31.815 | | | |
| R1 | 25.716 | d1 = | 7.772 | nd1 | 1.9108 | v1 | 35.26 |
| R2 | 12.715 | d2 = | 10.315 | | | |
| R3 | −11.768 | d3 = | 7.670 | nd2 | 1.8513 | v2 | 40.10 |
| R4 | −20.582 | d4 = | 1.804 | | | |
| R5 | 104.563 | d5 = | 6.335 | nd3 | 1.8513 | v3 | 40.10 |
| R6 | −21.985 | d6 = | 0.294 | | | |
| R7 | 58.715 | d7 = | 7.808 | nd4 | 1.9229 | v4 | 20.88 |
| R8 | 20.712 | d8 = | 1.545 | | | |
| R9 | 38.491 | d9 = | 5.874 | nd5 | 1.6204 | v5 | 60.37 |
| R10 | −18.158 | d10 = | 6.845 | | | |
| R11 | −115.016 | d11 = | 11.234 | nd6 | 1.9108 | v6 | 35.26 |
| R12 | 197.359 | d12 = | 0.316 | | | |
| R13 | 20.049 | d13 = | 4.395 | nd7 | 1.8513 | v7 | 40.10 |
| R14 | 25.768 | d14 = | 2.000 | | | |
| R15 | ∞ | d15 = | 0.500 | ndg | 1.5115 | vg | 62.57 |
| R16 | ∞ | d16 = | 2.000 | | | |

Table 16 shows aspheric data of the second lens L2, the third lens L3 and the seventh lens L7 in the camera optical lens 50 according to Embodiment 5 of the present disclosure.

TABLE 16

| | Conic Coefficient | Aspherical Coefficient | | | | |
|---|---|---|---|---|---|---|
| | k | A4 | A6 | A8 | A10 | A12 |
| R3 | −5.8858E−01 | 1.6781E−04 | 2.3852E−07 | −2.3706E−08 | 2.9658E−10 | −9.6141E−13 |
| R4 | −8.6034E+00 | 1.9221E−04 | −8.0035E−07 | 4.1159E−10 | 3.3834E−11 | −4.7761E−13 |
| R5 | 2.5795E+01 | 1.8964E−04 | −3.1148E−06 | 3.7850E−08 | −2.9670E−10 | 9.9538E−13 |
| R6 | −2.0443E+00 | −5.7282E−06 | −1.8425E−08 | 1.7106E−09 | −1.2633E−11 | −3.4563E−14 |
| R13 | −7.5799E−01 | −4.9759E−05 | −8.3093E−08 | 1.4180E−09 | −1.5128E−11 | 5.3937E−14 |
| R14 | −1.7766E+00 | −4.7155E−05 | −5.7766E−07 | 2.8307E−09 | −2.9227E−11 | 1.7422E−13 |

| | Conic Coefficient | Aspherical Coefficient | | | | |
|---|---|---|---|---|---|---|
| | k | A14 | A16 | A18 | A20 | A22 |
| R3 | −5.8858E−01 | −1.5359E−14 | 1.4543E−16 | −1.4202E−19 | 2.8774E−22 | −1.5425E−23 |
| R4 | −8.6034E+00 | −4.5925E−16 | 3.9374E−17 | −2.9656E−19 | 1.2821E−21 | −3.7000E−24 |
| R5 | 2.5795E+01 | 3.5773E−15 | −4.4428E−17 | 7.2709E−20 | 3.8480E−22 | −1.8731E−24 |
| R6 | −2.0443E+00 | 1.7553E−15 | −1.7218E−17 | 6.2426E−20 | −1.2800E−22 | −2.3405E−25 |
| R13 | −7.5799E−01 | 7.2263E−17 | −9.7766E−19 | −1.2210E−21 | 1.2975E−23 | −2.7668E−27 |
| R14 | −1.7766E+00 | −2.6759E−16 | 3.7970E−19 | −4.1581E−21 | −1.2507E−23 | 7.8309E−26 |

Table 17 and Table 18 show design data of inflection points and stationary points of each lens in the camera optical lens 50 according to Embodiment 5 of the present disclosure.

TABLE 17

| | Number of inflection points | Inflection point position 1 | Inflection point position 2 |
|---|---|---|---|
| P1R1 | 0 | / | / |
| P1R2 | 0 | / | / |
| P2R1 | 0 | / | / |
| P2R2 | 2 | 4.135 | 9.355 |
| P3R1 | 1 | 9.305 | / |
| P3R2 | 0 | / | / |
| P4R1 | 0 | / | / |
| P4R2 | 0 | / | / |
| P5R1 | 0 | / | / |
| P5R2 | 0 | / | / |
| P6R1 | 0 | / | / |
| P6R2 | 0 | / | / |
| P7R1 | 1 | 8.745 | / |
| P7R2 | 1 | 5.895 | / |

TABLE 18

| | Number of stationary points | Stationary point position 1 |
|---|---|---|
| P1R1 | 0 | / |
| P1R2 | 0 | / |
| P2R1 | 0 | / |
| P2R2 | 1 | 8.435 |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |
| P7R1 | 0 | / |
| P7R2 | 1 | 9.445 |

FIG. 18 shows field curvature and distortion of light with a wavelength of 940 nm after passing through the camera optical lens 50. The field curvature S in FIG. 18 is the field curvature in a sagittal direction, and T is the field curvature in a meridional direction. FIG. 19 and FIG. 20 respectively show lateral color and longitudinal aberration of light with wavelengths 930 nm, 940 nm and 950 nm after passing through the camera optical lens 50.

As shown in Table 22, Embodiment 5 satisfies each relational expression.

In this embodiment, the entrance pupil diameter ENPD of the camera optical lens 50 is 10.385 mm, the full field of view image height IH in a diagonal direction is 11.851 mm, and the field of view FOV in s diagonal direction is 108.37°, so that the camera optical lens 50 meets the design requirements of a large aperture, a wide-angle, and an ultra-thin, and the on-axis and off-axis chromatic aberration thereof is sufficiently compensated for, and it has good optical characteristics.

Comparative Example

FIG. 21 is a structural schematic diagram of a camera optical lens 60 in a Comparative Example, and the symbol meaning thereof is the same as that in Embodiment 1, so the same parts are not described herein again.

Table 19 shows design data of the camera optical lens 60 of the present disclosure.

TABLE 19

| | R | d | | nd | | vd |
|---|---|---|---|---|---|---|
| S1 | ∞ | d0 = −32.407 | | | | |
| R1 | 35.625 | d1 = 0.492 | nd1 | 1.9108 | v1 | 35.26 |
| R2 | 10.587 | d2 = 14.507 | | | | |
| R3 | −13.581 | d3 = 4.758 | nd2 | 1.8513 | v2 | 40.10 |
| R4 | −16.724 | d4 = 1.770 | | | | |
| R5 | 142.455 | d5 = 12.507 | nd3 | 1.8513 | v3 | 40.10 |
| R6 | −18.964 | d6 = −0.029 | | | | |
| R7 | 24.672 | d7 = 6.812 | nd4 | 1.9229 | v4 | 20.88 |
| R8 | 17.373 | d8 = 3.311 | | | | |
| R9 | −161.073 | d9 = 3.028 | nd5 | 1.6204 | v5 | 60.37 |
| R10 | −20.906 | d10 = 0.290 | | | | |
| R11 | 66.049 | d11 = 9.017 | nd6 | 1.9108 | v6 | 35.26 |
| R12 | 32.940 | d12 = 2.588 | | | | |
| R13 | 25.562 | d13 = 4.116 | nd7 | 1.8513 | v7 | 40.10 |
| R14 | 266.060 | d14 = 1.704 | | | | |
| R15 | ∞ | d15 = 0.500 | ndg | 1.5115 | vg | 62.57 |
| R16 | ∞ | d16 = 2.080 | | | | |

Table 20 shows aspheric surface data of the second lens L2, the third lens L3 and the seventh lens L7 in the camera optical lens 60 in the Comparative Example of the present disclosure.

TABLE 20

| | Conic Coefficient | | Aspherical Coefficient | | | |
| | k | A4 | A6 | A8 | A10 | A12 |
|---|---|---|---|---|---|---|
| R3 | −6.2306E−01 | 1.7869E−04 | 2.1097E−07 | −2.3848E−08 | 2.7802E−10 | −1.1439E−12 |
| R4 | −6.2716E+00 | 1.7766E−04 | −7.7782E−07 | 9.5422E−11 | 3.6839E−11 | −5.1997E−13 |
| R5 | 5.8413E+01 | 1.9111E−04 | −3.1483E−06 | 3.8132E−08 | −2.9450E−10 | 1.0001E−12 |
| R6 | −2.3981E+00 | −1.2235E−05 | −2.9720E−08 | 1.6301E−09 | −1.2599E−11 | −2.7548E−14 |
| R13 | 6.9622E−01 | −8.5131E−06 | −1.1134E−07 | 1.4918E−09 | −1.6260E−11 | 5.1515E−14 |
| R14 | −1.0662E+02 | 3.2137E−06 | −1.8158E−07 | 3.9390E−09 | −2.8574E−11 | 1.2828E−13 |

| | Conic Coefficient | | Aspherical Coefficient | | | |
| | k | A14 | A16 | A18 | A20 | A22 |
|---|---|---|---|---|---|---|
| R3 | −6.2306E−01 | −1.3381E−14 | 1.4281E−16 | −1.6973E−19 | −7.0637E−22 | −4.1325E−23 |
| R4 | −6.2716E+00 | −8.8802E−16 | 3.5697E−17 | −3.2034E−19 | 1.2637E−21 | −1.7404E−24 |
| R5 | 5.8413E+01 | 3.5127E−15 | −4.5518E−17 | 6.7481E−20 | 4.1524E−22 | −5.6931E−25 |
| R6 | −2.3981E+00 | 1.7694E−15 | −1.7290E−17 | 6.2022E−20 | −1.2918E−22 | −9.2888E−26 |
| R13 | 6.9622E−01 | 7.5216E−17 | −6.5546E−19 | 2.3667E−21 | 3.2410E−23 | 1.2754E−26 |
| R14 | −1.0662E+02 | −2.8904E−16 | 1.7141E−18 | 9.6156E−21 | 8.0760E−23 | 5.9878E−25 |

Table 21 shows design data of inflection points of each lens in the camera optical lens 60 in the Comparative Example of the present disclosure.

TABLE 21

| | Number of inflection points | Inflection point position 1 | Inflection point position 2 |
|---|---|---|---|
| P1R1 | 0 | / | / |
| P1R2 | 0 | / | / |
| P2R1 | 0 | / | / |
| P2R2 | 2 | 4.665 | 8.305 |
| P3R1 | 1 | 9.705 | / |
| P3R2 | 0 | / | / |
| P4R1 | 0 | / | / |
| P4R2 | 0 | / | / |
| P5R1 | 0 | / | / |
| P5R2 | 0 | / | / |
| P6R1 | 0 | / | / |
| P6R2 | 0 | / | / |
| P7R1 | 0 | / | / |
| P7R2 | 0 | / | / |

FIG. 22 shows field curvature and distortion of light with a wavelength of 940 nm after passing through the camera optical lens 60. The field curvature S in FIG. 22 is the field curvature in a sagittal direction, and T is the field curvature in a meridional direction. FIG. 23 and FIG. 24 respectively show lateral color and longitudinal aberration of light with wavelengths 930 nm, 940 nm and 950 nm after passing through the camera optical lens 60.

In this Comparative Example, the entrance pupil diameter ENPD of the camera optical lens 60 is 5.801 mm, the full field of view image height IH in a diagonal direction is 11.851 mm, and the field of view FOV in a diagonal direction is 163.78°.

Table 22 shows the values corresponding to the various values and parameters specified in the relational expressions in Embodiments 1-5 and the Comparative Example. Obviously, the camera optical lens 60 in the Comparative Example does not satisfy the above relational expression: 80.00≤FOV/FNO≤120.00. The camera optical lens 60 cannot effectively consider both a field of view and a large aperture, and has insufficient optical performance.

TABLE 22

| Parameters and Relational Expressions | Example 1 | Example 2 | Example 3 | Example 4 | Example 5 | Comparative Example |
|---|---|---|---|---|---|---|
| R7/R8 | 1.52 | 1.07 | 2.99 | 1.52 | 2.83 | 1.42 |
| FOV/FNO | 100.97 | 105.33 | 80.10 | 119.00 | 80.15 | 121.35 |
| TTL/d3 | 15.70 | 20.00 | 17.52 | 17.97 | 10.00 | 14.18 |
| f6/f7 | −1.89 | −1.53 | −4.00 | −2.95 | −1.00 | −2.52 |
| f | 10.049 | 9.219 | 11.597 | 9.452 | 14.020 | 7.831 |
| f1 | −18.167 | −18.380 | −19.648 | −15.143 | −39.427 | −17.136 |
| f2 | −257.967 | −93.336 | −873.467 | −411.651 | −54.633 | −278.148 |
| f3 | 21.295 | 21.512 | 20.871 | 21.241 | 22.355 | 20.862 |
| f4 | −92.551 | 1308.692 | −40.959 | −93.238 | −39.999 | −118.077 |
| f5 | 41.452 | 46.001 | 35.279 | 42.171 | 21.057 | 39.071 |
| f6 | −66.089 | −50.834 | −191.342 | −92.624 | −80.546 | −84.941 |
| f7 | 35.041 | 33.179 | 47.836 | 31.433 | 80.546 | 33.748 |
| f12 | −18.239 | −14.715 | −21.465 | −15.962 | −24.059 | −17.411 |
| FNO | 1.35 | 1.35 | 1.35 | 1.35 | 1.35 | 1.35 |

Wherein, f12 is a combined focal length of the first lens L1 and the second lens L2.

The above description is only embodiments of the present disclosure, and it should be noted that those skilled in the art can also make improvements without departing from the concept of the present disclosure, but these all fall within the protection scope of the present disclosure.

What is claimed is:

1. A camera optical lens, comprising from an object side to an image side: a first lens, a second lens, a third lens, a fourth lens, a fifth lens, a sixth lens and a seventh lens;

wherein a central curvature radius of an object-side surface of the fourth lens is R7, a central curvature radius of an image-side surface of the fourth lens is R8, a field of view of the camera optical lens is FOV, an f-number of the camera optical lens is FNO, a total optical length from an object-side surface of the first lens to an image plane of the camera optical lens along an optic axis of the camera optical lens is TTL, an on-axis thickness of the second lens is d3, a focal length of the sixth lens is f6, a focal length of the seventh lens is f7, and following relational expressions are satisfied:

$$1.00 \le R7/R8 \le 3.00;$$

$$80.00 \le FOV/FNO \le 120.00;$$

$$10.00 \le TTL/d3 \le 20.00;$$

and $$-4.00 \le f6/f7 \le -1.00.$$

2. The camera optical lens as described in claim 1, wherein an on-axis thickness of the third lens is d5, an on-axis thickness of the fourth lens is d7, and a following relational expression is satisfied:

$$0.80 \le d5/d7 \le 4.00.$$

3. The camera optical lens as described in claim 1, wherein a central curvature radius of an object-side surface of the first lens is R1, and a central curvature radius of an image-side surface of the first lens is R2, and a following relational expression is satisfied:

$$1.20 \le (R1 + R2)/(R1 - R2) \le 3.00.$$

4. The camera optical lens as described in claim 1, wherein a focal length of the fifth lens is f5, a focal length of the camera optical lens is f, and a following relational expression is satisfied:

$$1.50 \le f5/f \le 5.00.$$

5. The camera optical lens as described in claim 1, wherein the first lens has a negative refractive power, an object-side surface of the first lens is convex in a paraxial region, and an image-side surface of the first lens is concave in the paraxial region; and a focal length of the first lens is f1, a focal length of the camera optical lens is f, and an on-axis thickness of the first lens is d1, and following relational expressions are satisfied:

$$-5.62 \le f1/f \le -1.07;$$

and $$0.01 \le d1/TTL \le 0.15.$$

6. The camera optical lens as described in claim 1, wherein the second lens has a negative refractive power, an object-side surface of the second lens is concave in a paraxial region, and an image-side surface of the second lens is convex in the paraxial region; and a focal length of the second lens is f2, a focal length of the camera optical lens is f, a central curvature radius of an object-side surface of the second lens is R3, a central curvature radius of an image-side surface of the second lens is R4, and following relational expressions are satisfied:

$$-150.64 \le f2/f \le -2.60;$$

and $$-26.46 \le (R3 + R4)/(R3 - R4) \le -2.45.$$

7. The camera optical lens as described in claim 1, wherein the third lens has a positive refractive power, an object-side surface of the third lens is convex in a paraxial region, and an image-side surface of the third lens is convex in the paraxial region; and a focal length of the third lens is f3, a focal length of the camera optical lens is f, a central curvature radius of an object-side surface of the third lens is R5, a central curvature radius of an image-side surface of the third lens is R6, and an on-axis thickness of the third lens is d5, and following relational expressions are satisfied:

$$0.80 \le f3/f \le 3.50;$$

$$0.33 \le (R5 + R6)/(R5 - R6) \le 1.14;$$

and $$0.04 \le d5/TTL \le 0.28.$$

8. The camera optical lens as described in claim 1, wherein the object-side surface of the fourth lens is convex in a paraxial region, and the image-side surface of the fourth lens is concave in the paraxial region; and a focal length of the fourth lens is f4, a focal length of the camera optical lens is f, and an on-axis thickness of the fourth lens is d7, and following relational expressions are satisfied:

$$-19.73 \le f4/f \le 212.93;$$

and $$0.02 \le d7/TTL \le 0.25.$$

9. The camera optical lens as described in claim 1, wherein the fifth lens has a positive refractive power, and an image-side surface of the fifth lens is convex in a paraxial region; and a central curvature radius of an object-side surface of the fifth lens is R9, a central curvature radius of the image-side surface of the fifth lens is R10, an on-axis thickness of the fifth lens is d9, and following relational expressions are satisfied:

$$0.18 \leq (R9 + R10)/(R9 - R10) \leq 2.37;$$

and $$0.02 \leq d9/TTL \leq 0.11.$$

10. The camera optical lens as described in claim 1, wherein the sixth lens has a negative refractive power, and an image-side surface of the sixth lens is concave in a paraxial region; and a focal length of the camera optical lens is f, a central curvature radius of an object-side surface of the sixth lens is R11, a central curvature radius of the image-side surface of the sixth lens is R12, an on-axis thickness of the sixth lens is d11, and following relational expressions are satisfied:

$$-33.00 \leq f6/f \leq -3.68;$$

$$-0.53 \leq (R11 + R12)/(R11 - R12) \leq 8.71;$$

and $$0.05 \leq d11/TTL \leq 0.22.$$

11. The camera optical lens as described in claim 1, wherein the seventh lens has a positive refractive power, and an object-side surface of the seventh lens is convex in a paraxial region; and a focal length of the camera optical lens is f, a central curvature radius of the object-side surface of the seventh lens is R13, a central curvature radius of an image-side surface of the seventh lens is R14, an on-axis thickness of the seventh lens is d13, and following relational expressions are satisfied:

$$1.66 \leq f7/f \leq 8.62;$$

$$-16.02 \leq (R13 + R14)/(R13 - R14) \leq -0.65;$$

and $$0.02 \leq d13/TTL \leq 0.10.$$

12. The camera optical lens as described in claim 1, wherein the first lens and/or the second lens and/or the third lens and/or the fourth lens and/or the fifth lens and/or the sixth lens and/or the seventh lens are made of glass.

* * * * *